US012178765B2

(12) United States Patent
Paltsev et al.

(10) Patent No.: US 12,178,765 B2
(45) Date of Patent: Dec. 31, 2024

(54) CHAIR-DRIVE INTERFACE ASSEMBLY, WHEELCHAIR AND/OR DRIVE

(71) Applicant: 9302204 Canada Inc., Richmond Hill (CA)

(72) Inventors: Dmitry Paltsev, Keswick (CA); Yevgeny Cherny, Richmond Hill (CA); Evelio Goderich, Richmond Hill (CA); Gennady Lisnyak, Richmond Hill (CA); Dmitry Marukh, Aurora (CA); Eduard Somin, Richmond Hill (CA)

( * ) Notice: Subject to any disclaimer, the term of this patent is extended or adjusted under 35 U.S.C. 154(b) by 744 days.

(21) Appl. No.: 16/996,043

(22) Filed: Aug. 18, 2020

(65) Prior Publication Data

US 2022/0054332 A1 Feb. 24, 2022

(51) Int. Cl.
*A61G 5/04* (2013.01)
*A61G 5/08* (2006.01)

(52) U.S. Cl.
CPC ............. *A61G 5/047* (2013.01); *A61G 5/042* (2013.01); *A61G 5/0816* (2016.11)

(58) Field of Classification Search
CPC ....... A61G 5/042; A61G 5/047; A61G 5/0816
USPC ............................................................ 180/13
See application file for complete search history.

(56) References Cited

U.S. PATENT DOCUMENTS 4,690,364 A 9/1987 Constantin
4,909,525 A 5/1990 Flowers
5,494,126 A 2/1996 Meeker et al.
6,599,079 B1 7/2003 Hermanson et al.
6,799,770 B2 10/2004 Patrick et al.
7,976,049 B2 * 7/2011 Chiu ...................... A61G 5/047 180/13
9,642,756 B2 5/2017 Lauret et al.
10,888,474 B2 * 1/2021 Kim ...................... A61G 5/047
2005/0214089 A1 9/2005 Girardin
2011/0095508 A1 4/2011 Chiu
2016/0324703 A1 11/2016 Castillo
2019/0015272 A1 1/2019 Benedini

FOREIGN PATENT DOCUMENTS

CN 109069335 12/2018

* cited by examiner

*Primary Examiner* — Jacob D Knutson
*Assistant Examiner* — Felicia L. Brittman-Alabi

(57) ABSTRACT

A chair-drive interface assembly is for use with a wheelchair assembly having a first chair-connection member and a second chair-connection member, and also for use with a drive assembly including a wheel assembly, a motor assembly, a drive-connection member and a steering assembly. The chair-drive interface assembly has a first connection member configured to be fixedly attached to the first chair-connection member. The chair-drive interface assembly also has a second connection member configured to be fixedly attached to the second chair-connection member. The second connection member is spaced apart from the first connection member. The chair-drive interface assembly also has a third connection member configured to be fixedly attached to the drive-connection member of the drive assembly.

19 Claims, 6 Drawing Sheets

CHAIR-DRIVE INTERFACE ASSEMBLY, WHEELCHAIR AND/OR DRIVE

TECHNICAL FIELD

This document relates to the technical field of (and is not limited to) (A) a synergistic combination of a chair-drive interface assembly, a wheelchair assembly and a drive assembly (and method therefor), and (B) a synergistic combination of a chair-drive interface assembly and a drive assembly, each configured to be connectable to a wheelchair assembly (and method therefor), and (C) a chair-drive interface assembly configured to be connectable to a wheelchair assembly and be connectable to a drive assembly (and method therefor).

BACKGROUND

A wheelchair is a chair with wheels that is used when walking is difficult for the user, or impossible, due to illness, injury, or disability, etc. Wheelchairs may be self-powered (by the user), or may be powered by a drive system (such as, by a combination of a battery and a motor).

SUMMARY

It will be appreciated that there exists a need to mitigate (at least in part) at least one problem associated with the existing (known) wheelchairs (also called the existing technology). After much study of, and experimentation with, existing wheelchairs, an understanding (at least in part) of the problem and its solution have been identified (at least in part) and are articulated (at least in part) as follows:

A connection system configured to connect a drive assembly 200 with a wheelchair assembly 900 may inadvertently structurally weaken, at least in part, the chair-drive interface assembly 100 and/or structurally weaken, at least in part, the wheelchair assembly 900.

What may be desired is a chair-drive interface assembly configured to: (A) promote, at least in part, transmission (dispersal) of a movement force from the drive assembly to the wheelchair assembly, and (B) prevent, at least in part, the drive assembly from imparting, at least in part, a force that structurally weakens, at least in part, the chair-drive interface assembly and/or structurally weakens, at least in part, the wheelchair assembly.

To mitigate, at least in part, at least one problem associated with the existing technology, there is provided (in accordance with a first aspect) an apparatus. The apparatus is for use with a wheelchair assembly having a first chair-connection member and a second chair-connection member spaced apart from the first chair-connection member. The apparatus is also for use with a drive assembly including a wheel assembly, a motor assembly, a drive-connection member and a steering assembly. The wheel assembly is configured to contact a working surface. The motor assembly is configured to couple to the wheel assembly, and is also configured to rotate the wheel assembly. The steering assembly is configured to couple to the wheel assembly, and is configured to steer the wheel assembly. The apparatus includes and is not limited to (comprises) a chair-drive interface assembly having a first connection member configured to be fixedly attached to the first chair-connection member. The chair-drive interface assembly also has a second connection member configured to be fixedly attached to the second chair-connection member. The second connection member is spaced apart from the first connection member. The chair-drive interface assembly also has a third connection member configured to be fixedly attached to the drive-connection member of the drive assembly. The third connection member is spaced apart from the second connection member and from the first connection member. In accordance with a preferred embodiment, the chair-drive interface assembly is configured to: (A) promote, at least in part, transmission (dispersal) of a movement force from the drive assembly across the first chair-connection member and the second chair-connection member of the wheelchair assembly, and (B) prevent, at least in part, the drive assembly from imparting, at least in part, a force that structurally weakens, at least in part, the chair-drive interface assembly or structurally weaken, at least in part, the wheelchair assembly. In accordance with a preferred embodiment, the first connection member and the second connection member (of the chair-drive interface assembly) are configured to promote, at least in part, transmission (dispersal) of a movement force from the drive assembly across the first chair-connection member and the second chair-connection member of the wheelchair assembly. In accordance with a preferred embodiment, the first connection member and the second connection member and the third connection member (of the chair-drive interface assembly) are also configured to prevent, at least in part, the drive assembly from imparting, at least in part, a force that structurally weakens (or breaks), at least in part, the chair-drive interface assembly and/or structurally weakens, at least in part, the wheelchair assembly.

To mitigate, at least in part, at least one problem associated with the existing technology, there is provided (in accordance with a second aspect) an apparatus. The apparatus is for use with a wheelchair assembly having a first chair-connection member and a second chair-connection member spaced apart from the first chair-connection member. The apparatus includes and is not limited to (comprises) a drive assembly and a chair-drive interface assembly. The drive assembly includes a wheel assembly, a motor assembly and a steering assembly. The wheel assembly is configured to contact a working surface. The motor assembly is configured to couple to the wheel assembly and is also configured to rotate the wheel assembly. The steering assembly is configured to couple to the wheel assembly, and is also configured to steer the wheel assembly. The chair-drive interface assembly has a first connection member configured to be fixedly attached to the first chair-connection member. The chair-drive interface assembly also has a second connection member configured to be fixedly attached to the second chair-connection member. The second connection member is spaced apart from the first connection member. The chair-drive interface assembly also has a third connection member configured to be fixedly attached to the drive assembly. The third connection member is spaced apart from the second connection member and from the first connection member. In accordance with a preferred embodiment, the chair-drive interface assembly is configured to: (A) promote, at least in part, transmission (dispersal) of a movement force from the drive assembly across the first chair-connection member and the second chair-connection member of the wheelchair assembly, and (B) prevent, at least in part, the drive assembly from imparting, at least in part, a force that structurally weakens, at least in part, the chair-drive interface assembly and/or structurally weakens, at least in part, the wheelchair assembly.

To mitigate, at least in part, at least one problem associated with the existing technology, there is provided (in accordance with a third aspect) an apparatus. The apparatus includes and is not limited to (comprises) a synergistic combination of a wheelchair assembly, a drive assembly and a chair-drive interface assembly. The wheelchair assembly has a first chair-connection member and a second chair-connection member spaced apart from the first chair-connection member. The drive assembly includes a wheel assembly, a motor assembly and a steering assembly. The wheel assembly is configured to contact a working surface. The motor assembly is configured to couple to the wheel assembly, and is also configured to rotate the wheel assembly. The steering assembly is configured to couple to the wheel assembly, and is configured to steer the wheel assembly. The chair-drive interface assembly has a first connection member configured to be fixedly attached to the first chair-connection member. The chair-drive interface assembly also has a second connection member configured to be fixedly attached to the second chair-connection member. The second connection member is spaced apart from the first connection member. The chair-drive interface assembly also has a third connection member configured to be fixedly attached to the drive assembly. The third connection member is spaced apart from the second connection member and from the first connection member.

To mitigate, at least in part, at least one problem associated with the existing technology, there is provided (in accordance with a fourth aspect) an apparatus. The apparatus is configured for use with (connection with) a wheelchair assembly and a drive assembly. The apparatus includes and is not limited to (comprises) a chair-drive interface assembly configured to be fixedly attached to a first chair-connection member of the wheelchair assembly. The chair-drive interface assembly is also configured to be fixedly attached to a second chair-connection member of the wheelchair assembly. The chair-drive interface assembly is also configured to be fixedly attached to a drive-connection member of the drive assembly. The chair-drive interface assembly is also configured to transmit a movement force (pulling force) from the drive assembly (that is, once the drive assembly is activated) to the wheelchair assembly; this is done in such a way that the chair-drive interface assembly, in use, distributes, at least in part, the movement force over (at least in part): (A) a first length extending along, at least in part, the first chair-connection member of the wheelchair assembly, and (B) a second length extending along, at least in part, the second chair-connection member of the wheelchair assembly. It will be appreciated that (A) and (B) do not imply an order or sequence of events, operations and/or steps, etc.

To mitigate, at least in part, at least one problem associated with the existing technology, there is provided (in accordance with a fifth aspect) an apparatus. The apparatus is configured for use with (connection to) a wheelchair assembly and a drive assembly. The apparatus includes and is not limited to (comprises) a chair-drive interface assembly configured to be fixedly attached to the wheelchair assembly. The chair-drive interface assembly is also configured to be fixedly attached to the drive assembly. The chair-drive interface assembly is also configured to transmit a movement force (pulling force) from the drive assembly, once the drive assembly is activated, to the wheelchair assembly. This is done in such a way that the chair-drive interface assembly, in use, distributes, at least in part, the movement force over (at least in part) an elongated portion (at least one elongated portion) of the wheelchair assembly. In accordance with a preferred embodiment, the chair-drive interface assembly is configured to: (A) promote, at least in part, transmission (dispersal) of the movement force across said at least one elongated portion of the wheelchair assembly, and (B) prevent, at least in part, the drive assembly from imparting a force that structurally weakens, at least in part, the chair-drive interface assembly and/or structurally weakens, at least in part, the wheelchair assembly.

To mitigate, at least in part, at least one problem associated with the existing technology, there is provided (in accordance with a sixth aspect) a method. The method is for connecting a wheelchair assembly and a drive assembly. The method includes and is not limited to (comprises) fixedly attaching a chair-drive interface assembly to the wheelchair assembly. The method also includes fixedly attaching a chair-drive interface assembly to the drive assembly. The method also includes transmitting (via the chair-drive interface assembly) a movement force from the drive assembly (once the drive assembly is activated) to the wheelchair assembly. This is done in such a way that the chair-drive interface assembly, in use, distributes, at least in part, the movement force over, at least in part, at least one elongated portion of the wheelchair assembly. The method may further include (in accordance with an option) extending, at least in part, said at least one elongated portion of the wheelchair assembly across opposite lateral sides of the wheelchair assembly. The chair-drive interface assembly, in use, promotes, at least in part, transmission (dispersal) of the movement force across said at least one elongated portion of the wheelchair assembly, and the drive assembly is prevented, at least in part, from imparting a force that structurally weakens, at least in part, the chair-drive interface assembly and/or structurally weakens, at least in part, the wheelchair assembly. In accordance with a preferred embodiment, the method also includes promoting, at least in part, transmission (dispersal) of the movement force across said at least one elongated portion of the wheelchair assembly. In accordance with a preferred embodiment, the method also includes preventing, at least in part, the drive assembly from imparting a force that structurally weakens, at least in part, the chair-drive interface assembly and/or structurally weakens, at least in part, the wheelchair assembly.

To mitigate, at least in part, at least one problem associated with the existing technology, there is provided (in accordance with a seventh aspect) a method. The method is for connecting a wheelchair assembly and a drive assembly. The method includes and is not limited to (comprises) fixedly attaching a first connection member, of a chair-drive interface assembly, to a first chair-connection member of the wheelchair assembly. The method also includes fixedly attaching a second connection member, of the chair-drive interface assembly, to a second chair-connection member of the wheelchair assembly. The second connection member is spaced apart from the first connection member. The method also includes fixedly attaching a third connection member of the chair-drive interface assembly to a drive-connection member of the drive assembly. The third connection member is spaced apart from the second connection member and from the first connection member.

To mitigate, at least in part, at least one problem associated with the existing technology, there is provided (in accordance with an eighth aspect) a method. The method is for connecting a wheelchair assembly and a drive assembly. The method includes and is not limited to (comprises) fixedly attaching a first connection member, of a chair-drive interface assembly, to a first chair-connection member of the wheelchair assembly. The method also includes fixedly attaching a second connection member, of the chair-drive interface assembly, to a second chair-connection member of the wheelchair assembly. The second connection member is spaced apart from the first connection member. The method also includes fixedly attaching a third connection member of the chair-drive interface assembly to a drive-connection member of the drive assembly. The third connection member is spaced apart from the second connection member and from the first connection member. The drive assembly includes a wheel assembly, a motor assembly and a steering assembly. The wheel assembly is configured to contact a working surface. The motor assembly is configured to couple to the wheel assembly, and is also configured to rotate the wheel assembly. The steering assembly is configured to couple to the wheel assembly, and is configured to steer the wheel assembly. In accordance with a preferred embodiment, the method further includes promoting, at least in part, transmission (dispersal) of a movement force from the drive assembly across the first chair-connection member and the second chair-connection member of the wheelchair assembly. In accordance with a preferred embodiment, the method further includes preventing, at least in part, the drive assembly from imparting, at least in part, a force that structurally weakens, at least in part, the chair-drive interface assembly and/or structurally weakens, at least in part, the wheelchair assembly.

To mitigate, at least in part, at least one problem associated with the existing technology, there is provided (in accordance with a ninth aspect), a chair-drive interface assembly configured to be fixedly attached to a frame assembly of a wheelchair assembly, and to be fixedly attached to a drive assembly. The chair-drive interface assembly is also configured to transmit a movement force from the drive assembly (that is once, or after, the drive assembly is attached to chair-drive interface assembly and is activated) to the wheelchair assembly; this is done, preferably, in such a way that the chair-drive interface assembly, in use, carries through, at least in part, the movement force over a distributed section of the frame assembly of the wheelchair assembly. Advantageously, this arrangement reduces (preferably, avoids) the focusing of the movement force to a relatively smaller portion of the frame assembly. In accordance with more preferred embodiment, the distributed section (such as at least one elongated portion) of the wheelchair assembly extends, at least in part, across opposite lateral sides of the wheelchair assembly; the chair-drive interface assembly is configured to extend, at least in part, over (along) the distributed section (such as, a bar, a cross bar, a wheelchair camber tube assembly); and the distributed section bisects the wheelchair assembly forwardly from the wheelchair assembly once the chair-drive interface assembly is mounted to the wheelchair assembly.

Other aspects are identified in the claims. Other aspects and features of the non-limiting embodiments may now become apparent to those skilled in the art upon review of the following detailed description of the non-limiting embodiments with the accompanying drawings. This Summary is provided to introduce concepts in simplified form that are further described below in the Detailed Description. This Summary is not intended to identify potentially key features or possible essential features of the disclosed subject matter, and is not intended to describe each disclosed embodiment or every implementation of the disclosed subject matter. Many other novel advantages, features, and relationships will become apparent as this description proceeds. The figures and the description that follow more particularly exemplify illustrative embodiments.

BRIEF DESCRIPTION OF THE DRAWINGS

The non-limiting embodiments may be more fully appreciated by reference to the following detailed description of the non-limiting embodiments when taken in conjunction with the accompanying drawings, in which.

Figure 1:
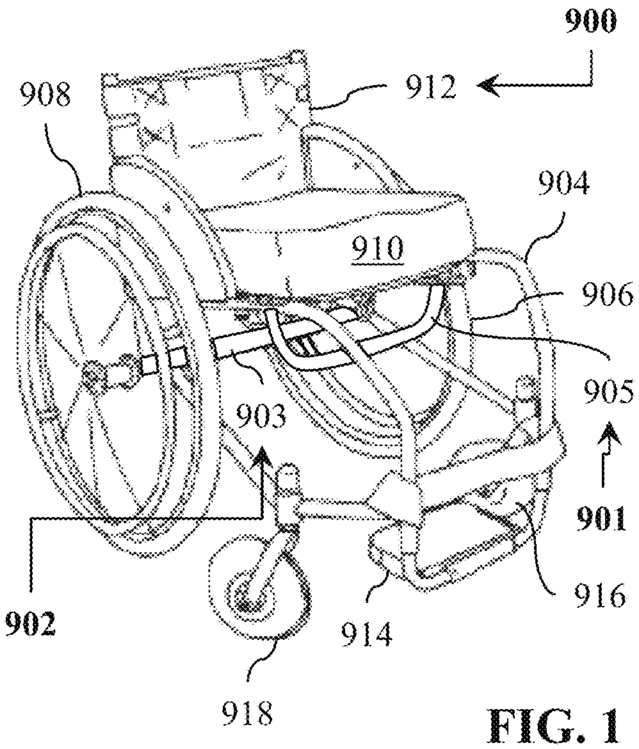
FIG. 1 depicts a perspective view of an embodiment of a wheelchair assembly.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted. Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, and well-understood, elements that are useful in commercially feasible embodiments are often not depicted to provide a less obstructed view of the embodiments of the present disclosure.

LISTING OF REFERENCE NUMERALS USED IN THE DRAWINGS

| | |
|---|---|
| chair-drive interface assembly 100 | third connection member 103 |
| first connection member 101 | adaptor assembly 104 |
| second connection member 102 | docking assembly 106 |
| movement direction 107 | second latch assembly 352 |
| drive assembly 200 | first latch 353 |
| wheel assembly 202 | second latch body 354 |
| drive-connection member 203 | latch-movement direction 356 |
| motor assembly 204 | first engagement feature 361 |
| steering assembly 206 | second engagement feature 362 |
| battery assembly 208 | third engagement feature 363 |
| drive stand 210 | fourth engagement feature 364 |
| housing assembly 212 | foldable bracket assembly 402 |
| shaft assembly 214 | base member 404 |
| first drive connector 221 | first collar 411 |
| second drive connector 222 | second collar 412 |
| rail-mounting assembly 224 | third collar 413 |
| first bracket assembly 301 | fourth collar 414 |
| second bracket assembly 302 | first lateral member 422 |
| third bracket assembly 303 | second lateral member 424 |
| connector 304 | third lateral member 426 |
| spaced-apart fingers (306A, 306B) | fourth lateral member 428 |
| connection holes 308 | first pivot connection 431 |
| body member 310 | second pivot connection 432 |
| first elongated member 311 | third pivot connection 433 |
| passageway 313 | fourth pivot connection 434 |
| second elongated member 312 | first pivot device 435 |
| first axle 321 | second pivot device 436 |
| second axle 322 | third pivot device 437 |
| rotation movement 324 | fourth pivot device 438 |
| first fixed connector 331 | first foldable member 441 |

-continued

| | |
|---|---|
| second fixed connector 332 | second foldable member 442 |
| first collar 341 | third foldable member 443 |
| second collar 342 | fourth foldable member 444 |
| third collar 343 | movement force 700 |
| fourth collar 344 | working surface 800 |
| first latch assembly 351 | wheelchair assembly 900 |
| first chair-connection member 901 | seating assembly 910 |
| second chair-connection member 902 | back support assembly 912 |
| wheelchair camber tube assembly 903 | foot-rest assembly 914 |
| frame assembly 904 | first caster 916 |
| cross bar 905 | second caster 918 |
| first chair wheel 906 | handlebars 920 |
| second chair wheel 908 | side frame members 922, 924 |

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the disclosure is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the disclosure is limited to the subject matter provided by the claims, and that the disclosure is not limited to the particular aspects depicted and described. It will be appreciated that the scope of the meaning of a device configured to be coupled to an item (that is, to be connected to, to interact with the item, etc.) is to be interpreted as the device being configured to be coupled to the item, either directly or indirectly. Therefore, "configured to" may include the meaning "either directly or indirectly" unless specifically stated otherwise.

FIG. 1 depicts a perspective view of an embodiment of a wheelchair assembly 900.

Referring to the embodiment as depicted in FIG. 1, the wheelchair assembly 900 includes a frame assembly 904 having opposite lateral sides (side sections or side tubes). The wheelchair assembly 900 also includes a first chair wheel 906 and a second chair wheel 908 positioned on (at) the opposite lateral sides of the frame assembly 904. The first chair wheel 906 and the second chair wheel 908 are spaced apart from each other (once they are rotatably mounted to the frame assembly 904). The first chair wheel 906 and the second chair wheel 908 are rotatably mounted to the frame assembly 904. The wheelchair assembly 900 also includes a seating assembly 910 mounted to the frame assembly 904, and is positioned between the first chair wheel 906 and the second chair wheel 908. A back support assembly 912 extends upwardly from a rear section of the seating assembly 910. Handlebars 920 extend rearward from an upper section of the back support assembly 912. A foot-rest assembly 914 is positioned at a lower section of the frame assembly 904, below the seating assembly 910. A pair of casters (916, 918) or a first caster 916 and a second caster 918 extend from a lower section of the frame assembly 904, and are positioned on opposite sides of the foot-rest assembly 914. In accordance with a preferred embodiment, the chair-drive interface assembly 100 configured to be fixedly attached to a frame assembly 904 of a wheelchair assembly 900, and to be fixedly attached to a drive assembly 200. The chair-drive interface assembly 100 is also configured to transmit a movement force 700 from the drive assembly 200 (that is once, or after, the drive assembly 200 is attached to chair-drive interface assembly 100 and is activated) to the wheelchair assembly 900; this is done, preferably, in such a way that the chair-drive interface assembly 100, in use, carries through, at least in part, the movement force 700 over a distributed section of the frame assembly 904 of the wheelchair assembly 900. Advantageously, this arrangement reduces (preferably, avoids) the focusing of the movement force 700 to a relatively smaller portion of the frame assembly 904. In accordance with more preferred embodiment, the distributed section (such as at least one elongated portion) of the wheelchair assembly 900 extends, at least in part, across opposite lateral sides of the wheelchair assembly 900; the chair-drive interface assembly 100 is configured to extend, at least in part, over (along) the distributed section (such as, a bar, a cross bar 905, a wheelchair camber tube assembly 903); and the distributed section bisects the wheelchair assembly 900 forwardly from the wheelchair assembly 900 once the chair-drive interface assembly 100 is mounted to the wheelchair assembly 900.

Referring to the embodiment as depicted in FIG. 1, the wheelchair assembly 900 also includes a first chair-connection member 901 and a second chair-connection member 902. Preferably, the frame assembly 904 includes the first chair-connection member 901 and the second chair-connection member 902. The first chair-connection member 901 and the second chair-connection member 902 are spaced apart from each other. The first chair-connection member 901 and the second chair-connection member 902 are included with (formed in or are attachable to) the frame assembly 904. For instance, the first chair-connection member 901 may include a cross bar 905 (also called a tube member) configured to be affixed to, and to span across, the opposite lateral sides of the frame assembly 904. For instance, the second chair-connection member 902 may include a wheelchair camber tube assembly 903 configured be rotatably mounted to the frame assembly 904, etc. The adaptor assembly 104 is configured to be adjustably custom-fitted between the first chair-connection member 901 and the second chair-connection member 902 of the wheelchair assembly 900. The wheelchair camber tube assembly 903 is also configured to span between, and to support, the first chair wheel 906 and the second chair wheel 908 (also called the rear wheels). In accordance with a preferred embodiment, the chair-drive interface assembly 100 is configured to bisect opposite sides of the wheelchair assembly 900 once the chair-drive interface assembly 100 is mounted to a frame assembly 904 of the wheelchair assembly 900; the chair-drive interface assembly 100 is configured to transmit a movement force 700 from the drive assembly 200, once the drive assembly 200 is activated, to the wheelchair assembly 900 in such a way that the chair-drive interface assembly 100, in use, distributes, at least in part, the movement force 700, over, at least in part; a first elongated portion of the wheelchair assembly 900 extends along, at least in part, the first chair-connection member 901 of the wheelchair assembly 900; and a second elongated portion of the wheelchair assembly 900 extends along, at least in part, the second chair-connection member 902 of the wheelchair assembly 900.

Figure 2:
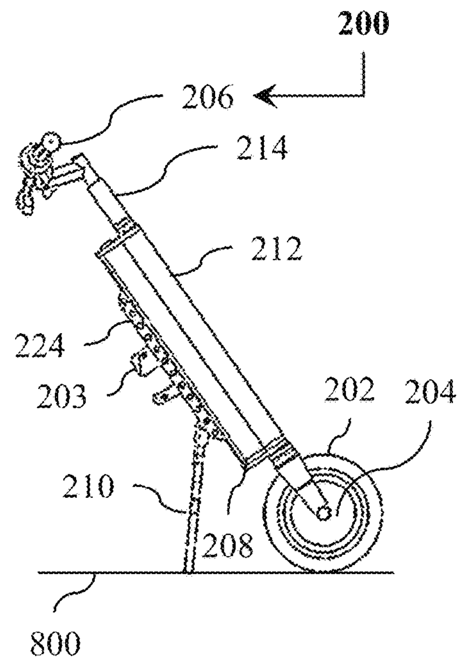
FIG. 2 and FIG. 3 depict a side view (FIG. 2) and a perspective view (FIG. 3) of embodiments of a drive assembly.
Figure 3:
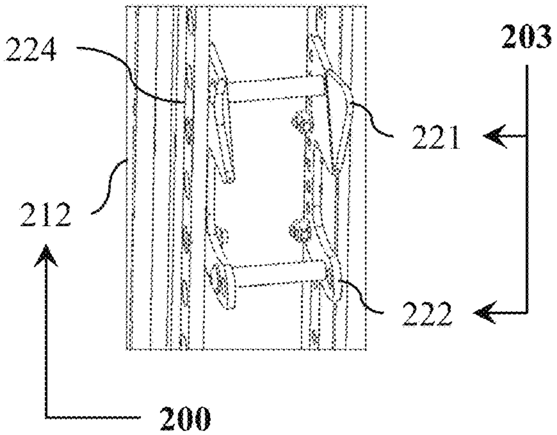

FIG. 2 and FIG. 3 depict a side view (FIG. 2) and a perspective view (FIG. 3) of embodiments of a drive assembly 200.

Referring to the embodiment as depicted in FIG. 2, the drive assembly 200 includes a housing assembly 212 configured to rotatably support (connect to) a wheel assembly 202. The wheel assembly 202 includes (preferably) a solid tire. The drive assembly 200 (preferably) has a weight (preferably) of about 9.4 kilograms (or about 20 pounds). The wheel assembly 202 is configured to contact, and move along, the working surface 800.

Referring to the embodiment as depicted in FIG. 2, a motor assembly 204 is operatively coupled to the wheel assembly 202. This is done in such a way that once the motor assembly 204 is energized (operated), the motor assembly 204, in use, urges rotation of the wheel assembly 202. The motor assembly 204 includes (preferably) a power switch (known and not depicted), along with at least one manual key for ensuring complete shut off of the motor assembly 204. The motor assembly 204 is configured to be controllable (provide at least a three-speed control mechanism, etc.). The motor assembly 204 includes (preferably) a drum brake (known and not depicted). The motor assembly 204 includes (preferably) a hub motor. The hub motor is, preferably, rated for about 250 watts.

Referring to the embodiment as depicted in FIG. 2, the wheel assembly 202 is rotatably mounted to a shaft assembly 214. A steering assembly 206 is attached to an end portion of the shaft assembly 214. The steering assembly 206 is spaced apart from the wheel assembly 202. The steering assembly 206 may include a steering stem (known and not depicted) configured to extend from the steering assembly 206, and configured to be rotatably connected to the wheel assembly 202.

Referring to the embodiment as depicted in FIG. 2, a battery assembly 208 is mounted to the housing assembly 212. The battery assembly 208 may be called the power unit, etc. The battery assembly 208 is rated (preferably) for about 36 volts and/or about 7.5 ampere hour (Ah). The battery assembly 208 is (preferably) configured to be electrically connectable with a battery charger (known and not depicted). The battery assembly 208 is electrically connected to the motor assembly 204, and is configured to power the motor assembly 204. The battery assembly 208 may include (preferably) a rechargeable electric battery, for convenience. The drive assembly 200 includes a user display device (known and not depicted, such as a liquid-display device) for providing at least one indication, such as battery charge status, distance travelled, and/or speed, etc. For instance, the drive assembly 200 may be powered OFF by a key that may be removable from the drive assembly 200. The drive assembly 200 may include a power button, etc.

Referring to the embodiment as depicted in FIG. 2, a drive stand 210 (kick stand) is mounted to the housing assembly 212. The drive stand 210 may include (preferably) a kick stand assembly. The drive stand 210 is (preferably) pivotally connected to the housing assembly 212.

Referring to the embodiment as depicted in FIG. 2, a rail-mounting assembly 224 is mounted to the housing assembly 212. To prevent accidental activation of the drive assembly 200, it is recommended that the user completely turn the power OFF for the drive assembly 200; this is done where (when) the user (A) parks the drive assembly 200, (B) transfers from, or to, the wheelchair assembly 900, and/or (C) loads or unloads weight. For improved safety, the drive assembly 200 may be detached from the docking assembly 106 (while the drive assembly 200 is not in use).

Referring to the embodiment as depicted in FIG. 3, the drive assembly 200 also includes a drive-connection member 203 mounted to the housing assembly 212. The drive-connection member 203 may be called a docking port, etc. The drive-connection member 203 is (preferably or more specifically) mounted to the rail-mounting assembly 224. The drive-connection member 203 is (preferably or more specifically) mounted to a selected portion along a position of the rail-mounting assembly 224. The drive-connection member 203 includes (preferably) a first drive connector 221 and a second drive connector 222. The first drive connector 221 and the second drive connector 222 are spaced apart from each other.

Figure 4:
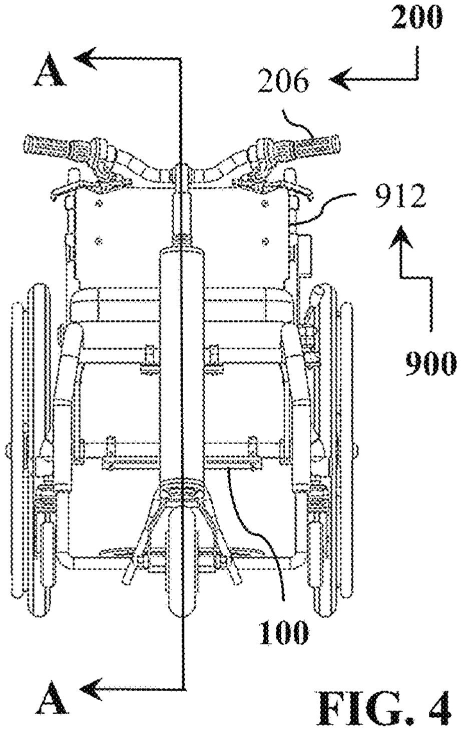
FIG. 4 to FIG. 22 depict a front view (FIG. 4), a cross-sectional side view (FIG. 5), close-up side views (FIG. 6 and FIG. 7), a side view (FIG. 8), a close-up side view (FIG. 9), close-up perspective side views (FIG. 10 and FIG. 11), cross-sectional views (FIG. 12 and FIG. 13), side views (FIG. 14 and FIG. 15) and perspective views (FIG. 16 to FIG. 22) of embodiments of a chair-drive interface assembly (for use with the wheelchair assembly of FIG. 1)

FIG. 4 depicts a cross-sectional side view of an embodiment of a chair-drive interface assembly 100.

Referring to the embodiment as depicted in FIG. 4, the chair-drive interface assembly 100 is configured to be connected to the wheelchair assembly 900. The chair-drive interface assembly 100 is also configured to be connected to the drive assembly 200. It will be appreciated that, for a first case, a synergistic combination of the chair-drive interface assembly 100, the wheelchair assembly 900, and the chair-drive interface assembly 100 may be manufactured and/or provided by one company (a single company). It will also be appreciated that, for a second case, the chair-drive interface assembly 100 may be manufactured and/or provided (supplied) by one company (a single company), in which case at least one or more companies (not related to the single company) may manufacture and/or provide the drive assembly 200 and/or the wheelchair assembly 900, etc. (and for this case, the chair-drive interface assembly 100 is treated as a retrofit item for the wheelchair assembly 900, etc.).

Figure 5:
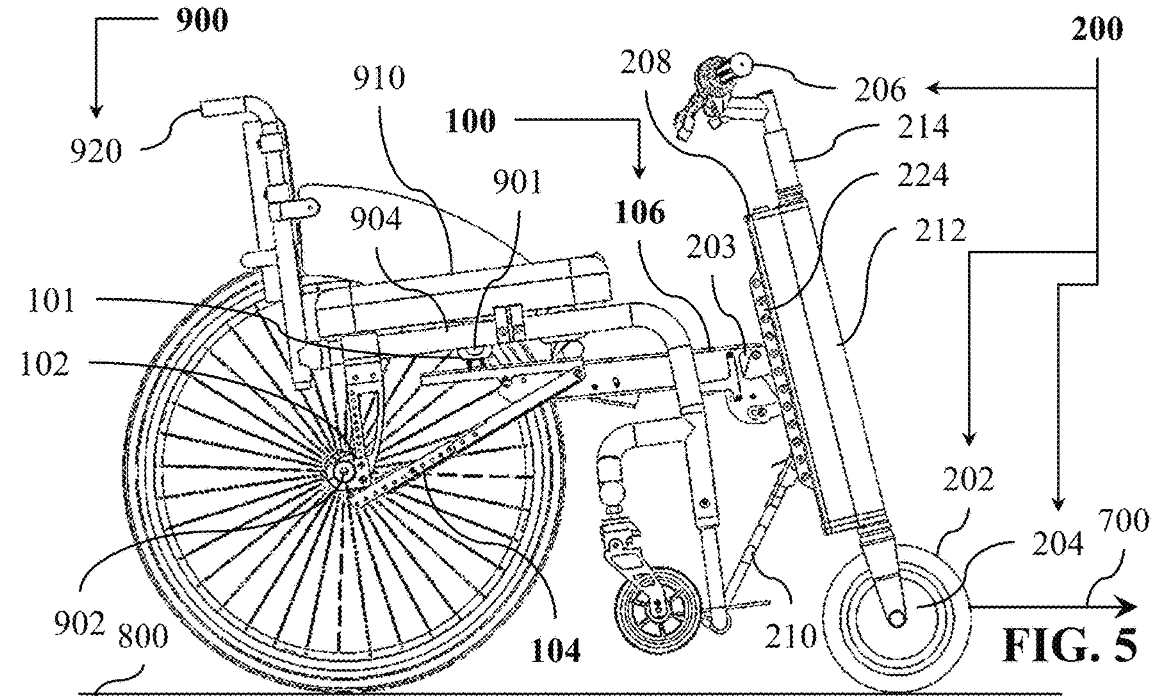
Figure 11:
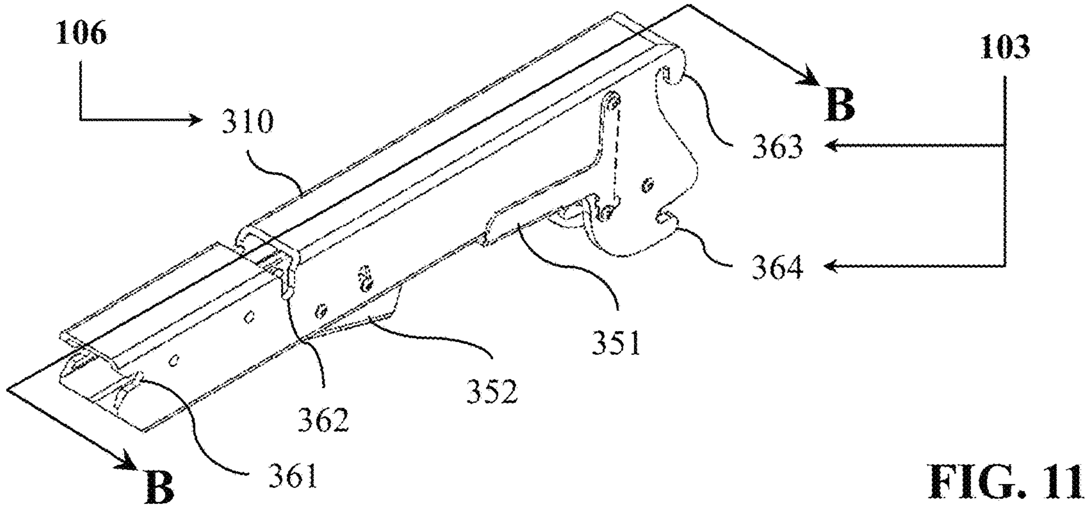
Figure 12:
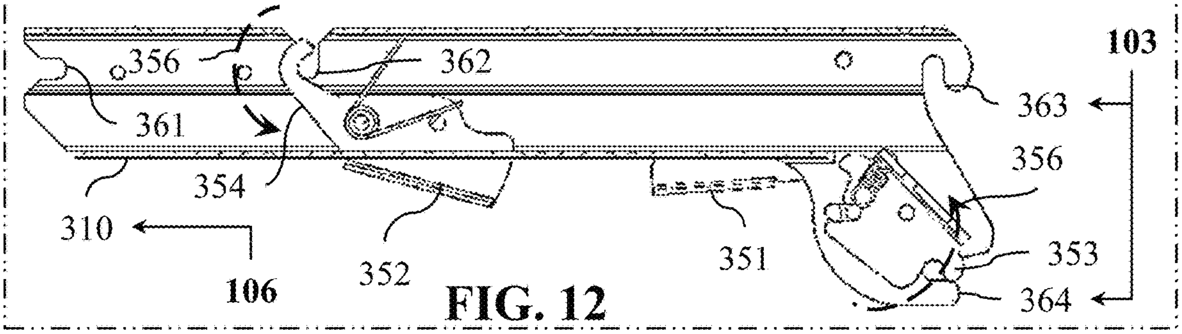
Figure 13:
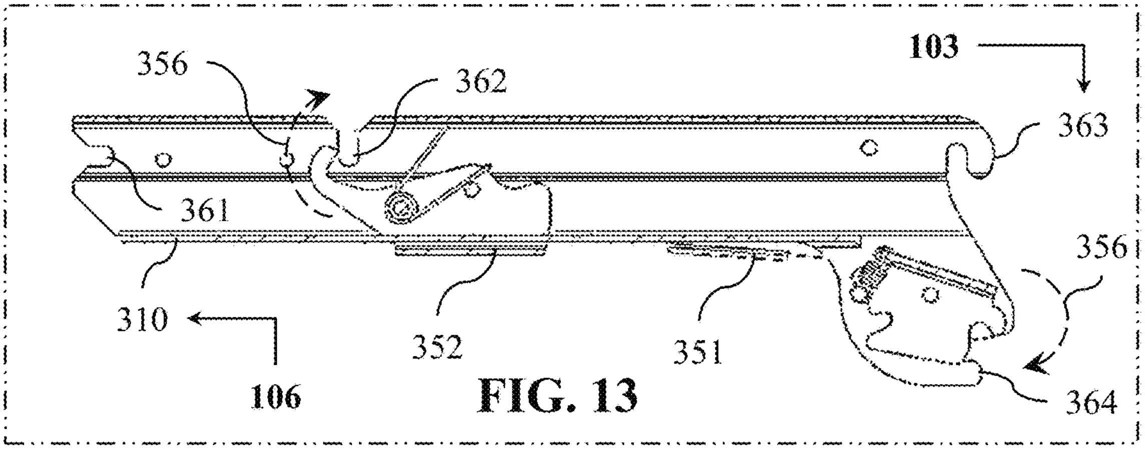
Figure 14:
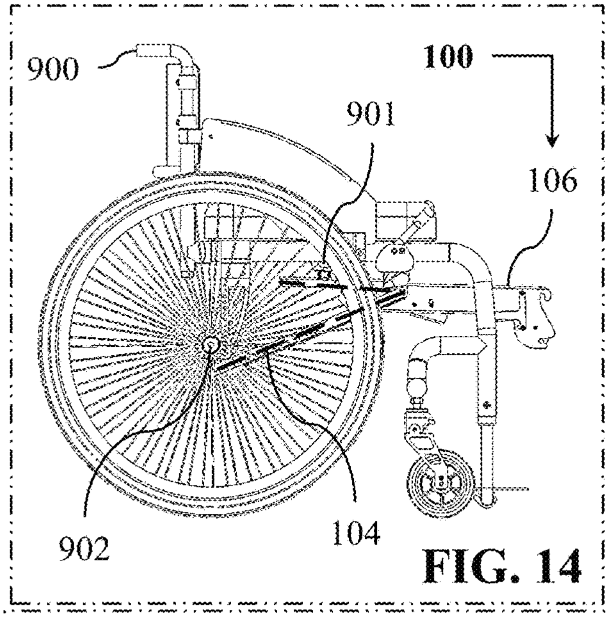
Figure 15:
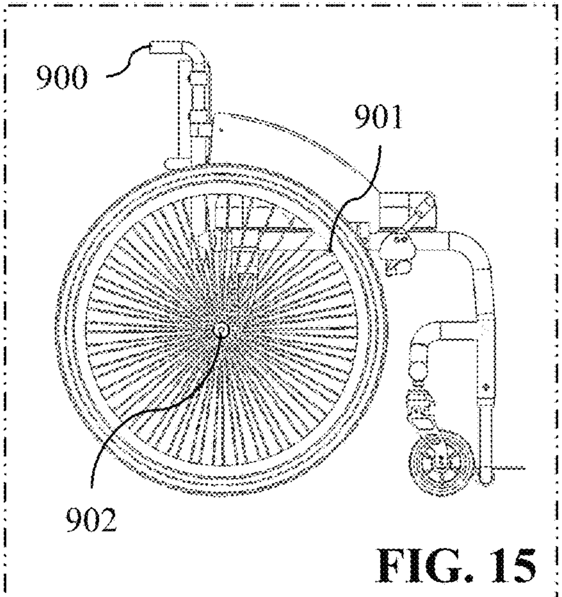

FIG. 5 to FIG. 22 depict a cross-sectional side view (FIG. 5), close-up side views (FIG. 6 and FIG. 7), a side view (FIG. 8), a close-up side view (FIG. 9), close-up perspective side views (FIG. 10 and FIG. 11), cross-sectional views (FIG. 12 and FIG. 13), side views (FIG. 14 and FIG. 15) and perspective views (FIG. 16 to FIG. 22) of embodiments of the chair-drive interface assembly 100 of FIG. 4. The cross-sectional view of FIG. 5 is taken along a cross-sectional line A-A (as depicted FIG. 4). The cross-sectional views of FIG. 12 and FIG. 13 are taken along a cross-sectional line B-B (as depicted FIG. 11).

Referring to the embodiments as depicted in FIG. 4 and FIG. 5, the chair-drive interface assembly 100 is configured to extend along an axis (also called a centerline) bisecting the wheelchair assembly 900, forwardly from the wheelchair assembly 900 once the chair-drive interface assembly 100 is mounted (fixedly mounted) to the wheelchair assembly 900. The chair-drive interface assembly 100 is configured (preferably) to extend along an axis bisecting the seating assembly 910 of the wheelchair assembly 900. The chair-drive interface assembly 100 is configured (alternatively) to extend along an axis bisecting the opposite sides of the wheelchair assembly 900. The chair-drive interface assembly 100 is configured (preferably) to extend forwardly from the wheelchair assembly 900 once the chair-drive interface assembly 100 is mounted to the frame assembly 904 of the wheelchair assembly 900.

Referring to the embodiment as depicted in FIG. 5 (the cross-sectional view of FIG. 5 is taken along a cross-sectional line A-A (as depicted FIG. 4), there is depicted an apparatus for use with (configured to be connectable to) a wheelchair assembly 900 and a drive assembly 200. The apparatus includes (and is not limited to) a chair-drive interface assembly 100 configured to be fixedly attached to the wheelchair assembly 900. The chair-drive interface assembly 100 is also configured to be fixedly attached to the drive assembly 200. The chair-drive interface assembly 100 is also configured to transmit a movement force 700 (pulling force, translation force) from the drive assembly 200 (that is, once the drive assembly 200 is activated) to the wheelchair assembly 900. This is done in such a way that the chair-drive interface assembly 100, in use, distributes, at least in part, the movement force 700 over, at least in part, an elongated portion (at least one elongated portion) of the frame assembly 904 (or an elongated portion of the wheelchair assembly 900). In accordance with a preferred embodiment, the chair-drive interface assembly 100 is configured to promote, at least in part, transmission (dispersal) of the movement force 700 across said at least one elongated portion of the wheelchair assembly 900. In accordance with a preferred embodiment, the chair-drive interface assembly 100 is also configured to prevent, at least in part, the drive assembly 200 from imparting a force that structurally weakens, at least in part, the chair-drive interface assembly 100 and/or structurally weakens, at least in part, the wheelchair assembly 900.

Figure 16:
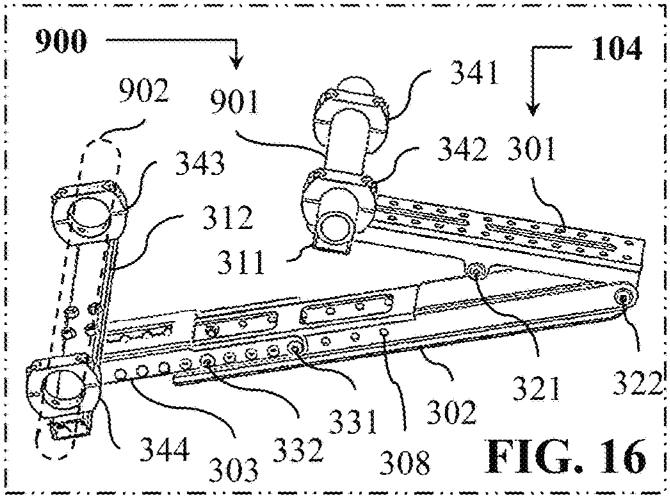
Figure 17:
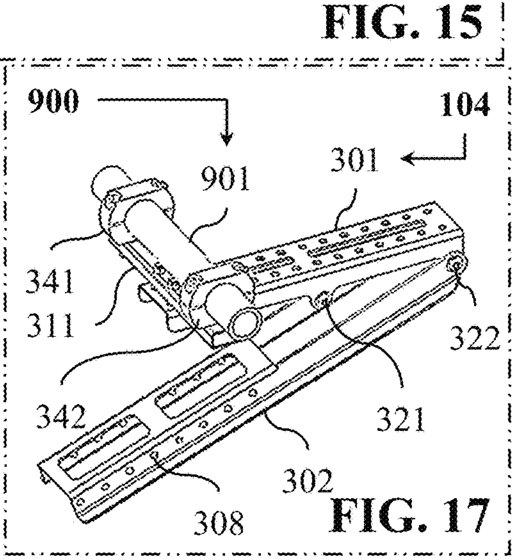

Referring to the embodiment as depicted in FIG. 5, it will be appreciated that the elongated portion (identified in the previous paragraph) of the wheelchair assembly 900 may be implemented in specific arrangements. In accordance with a first implementation, the elongated portion or at least one elongated portion (of the wheelchair assembly 900) may extend, at least in part, across (along) opposite lateral sides of (the frame assembly 904 of) the wheelchair assembly 900. In accordance with a second implementation, the elongated portion or at least one elongated portion (of the wheelchair assembly 900) may extend, at least in part, across (along) opposite lateral sides of (the frame assembly 904 of) the wheelchair assembly 900. In accordance with a third implementation, the elongated portion or at least one elongated portion (of the wheelchair assembly 900) may extend, at least in part, across (along) an elongated length of the first elongated member 311 between a first collar 341 and a second collar 342 (as depicted in FIG. 17). In accordance with a fourth implementation, the elongated portion or at least one elongated portion (of the wheelchair assembly 900) may extend, at least in part, across (along) an elongated length of the second elongated member 312 between a third collar 343 and a fourth collar 344 (as depicted in FIG. 16). In accordance with a fifth implementation, the elongated portion or at least one elongated portion (of the wheelchair assembly 900) may extend, at least in part, across (along): (A) an elongated length of the first elongated member 311 between a first collar 341 and a second collar 342 (as depicted in FIG. 17), and (B) an elongated length of the second elongated member 312 between a third collar 343 and a fourth collar 344 (as depicted in FIG. 16). It will be appreciated that (A) and (B) do not imply an order or sequence of events, operations and/or steps, etc. A technical effect of the above arrangements provides the case where the chair-drive interface assembly 100 prevents, at least in part, unwanted focusing of the movement force 700 to any one specific spot (portion) of the wheelchair assembly 900, and/or promotes, at least in part, the transmission (dispersal) of the movement force 700 over or across (over the elongated portion or at least one elongated portion of) the wheelchair assembly 900. In this arrangement, the drive assembly 200 may be prevented (at least in part) from imparting forces (to the wheelchair assembly 900), which may structurally weaken, at least in part, the chair-drive interface assembly 100 and or structurally weaken, at least in part, the wheelchair assembly 900. In accordance with a preferred embodiment, the chair-drive interface assembly 100 is configured to promote, at least in part, transmission (dispersal) of the movement force 700 across said at least one elongated portion of the wheelchair assembly 900. In accordance with a preferred embodiment, the chair-drive interface assembly 100 is also configured to prevent, at least in part, the drive assembly 200 from imparting a force that structurally weakens, at least in part, the chair-drive interface assembly 100 and/or structurally weakens, at least in part, the wheelchair assembly 900.

Referring to the embodiment as depicted in FIG. 5, there is depicted an apparatus for use with (configured to be connected to) a wheelchair assembly 900 and a drive assembly 200. The apparatus includes (and is not limited to) a chair-drive interface assembly 100 configured to be fixedly attached to a first chair-connection member 901 of the wheelchair assembly 900. The chair-drive interface assembly 100 is also configured to be fixedly attached to a second chair-connection member 902 of the wheelchair assembly 900. The chair-drive interface assembly 100 is also configured to be fixedly attached to a drive-connection member 203 of the drive assembly 200. The chair-drive interface assembly 100 is also configured to transmit a movement force 700 (pulling force) from the drive assembly 200 (once the drive assembly 200 is activated) to the wheelchair assembly 900. This is done in such a way that the chair-drive interface assembly 100, in use, distributes, at least in part, the movement force 700 over (at least in part): (A) a first length extending along, at least in part, the first chair-connection member 901 of the wheelchair assembly 900, and (B) a second length extending along, at least in part, the second chair-connection member 902 of the wheelchair assembly 900. It will be appreciated that (A) and (B) do not imply an order or sequence of events, operations and/or steps, etc. In accordance with a first specific implementation, the first length extends along, at least in part, an elongated length of the first elongated member 311 between a first collar 341 and a second collar 342 (as depicted in FIG. 17). In accordance with a second specific implementation, the second length extends, at least in part, along elongated length of the second elongated member 312 between a third collar 343 and a fourth collar 344 (as depicted in FIG. 16). A technical effect provided by the above arrangements is that the chair-drive interface assembly 100 (in use) prevents, at least in part, unwanted focusing of the movement force 700 to a specific spot or portion of the wheelchair assembly 900, and/or promotes dispersal (transmission) of the movement force 700 to (across or over at least one component or portion of) the wheelchair assembly 900.

Referring to the embodiment as depicted in FIG. 5, there is depicted a first apparatus for use with a wheelchair assembly 900 having a first chair-connection member 901 and a second chair-connection member 902 spaced apart from the first chair-connection member 901. The first apparatus is also for use with a drive assembly 200 including a wheel assembly 202, a motor assembly 204, a drive-connection member 203 and a steering assembly 206. The wheel assembly 202 is configured to contact a working surface 800, and the motor assembly 204 is configured to couple to the wheel assembly 202, and is also configured to rotate the wheel assembly 202. The steering assembly 206 is configured to couple to the wheel assembly 202, and is configured to steer the wheel assembly 202. The first apparatus includes (and is not limited to or comprises) a chair-drive interface assembly 100 having a first connection member 101 configured to be fixedly attached to the first chair-connection member 901. The chair-drive interface assembly 100 also has a second connection member 102 configured to be fixedly attached to the second chair-connection member 902. The second connection member 102 is spaced apart from the first connection member 101. The chair-drive interface assembly 100 also has a third connection member 103 configured to be fixedly attached to the drive-connection member 203 of the drive assembly 200. The third connection member 103 is spaced apart from the second connection member 102 and from the first connection member 101.

Referring to the embodiment as depicted in FIG. 5, the chair-drive interface assembly 100 is configured to transmit a movement force 700 (pulling force) from the drive assembly 200 (once the drive assembly 200 is activated) to the wheelchair assembly 900. This is done in such a way that the chair-drive interface assembly 100, in use, distributes, at least in part, the movement force 700 over (at least in part): (A) a first length extending along, at least in part, the first chair-connection member 901 of the wheelchair assembly 900, and (B) a second length extending along, at least in part, the second chair-connection member 902 of the wheelchair assembly 900. It will be appreciated that (A) and (B) do not imply an order or sequence of events, operations and/or steps, etc.

Referring to the embodiment as depicted in FIG. 5, there is depicted a second apparatus for use with a wheelchair assembly 900 having a first chair-connection member 901 and a second chair-connection member 902 spaced apart from the first chair-connection member 901. The second apparatus includes (and is not limited to or comprises) a drive assembly 200 including a wheel assembly 202, a motor assembly 204 and a steering assembly 206. The wheel assembly 202 is configured to contact a working surface 800. The motor assembly 204 is configured to couple to the wheel assembly 202, and is also configured to rotate the wheel assembly 202. The steering assembly 206 is configured to couple to the wheel assembly 202, and is configured to steer the wheel assembly 202. The second apparatus also includes (and is not limited to or comprises) a chair-drive interface assembly 100 having a first connection member 101 configured to be fixedly attached to the first chair-connection member 901. The chair-drive interface assembly 100 also has a second connection member 102 configured to be fixedly attached to the second chair-connection member 902. The second connection member 102 is spaced apart from the first connection member 101. The chair-drive interface assembly 100 also has a third connection member 103 configured to be fixedly attached to the drive assembly 200. The third connection member 103 is spaced apart from the second connection member 102 and from the first connection member 101.

Referring to the embodiment as depicted in FIG. 5, there is depicted a third apparatus including and not limited to (comprising) a wheelchair assembly 900 having a first chair-connection member 901 and a second chair-connection member 902 spaced apart from the first chair-connection member 901. The third apparatus also includes (and is not limited to or comprises) a drive assembly 200 including a wheel assembly 202, a motor assembly 204 and a steering assembly 206. The wheel assembly 202 is configured to contact a working surface 800. The motor assembly 204 is configured to couple to the wheel assembly 202, and is also configured to rotate the wheel assembly 202. The steering assembly 206 is configured to couple to the wheel assembly 202, and is configured to steer the wheel assembly 202. The third apparatus also includes (and is not limited to or comprises) a chair-drive interface assembly 100 having a first connection member 101 configured to be fixedly attached to the first chair-connection member 901. The chair-drive interface assembly 100 also has a second connection member 102 configured to be fixedly attached to the second chair-connection member 902. The second connection member 102 is spaced apart from the first connection member 101. The chair-drive interface assembly 100 also has a third connection member 103 configured to be fixedly attached to the drive assembly 200. The third connection member 103 is spaced apart from the second connection member 102 and from the first connection member 101. In accordance with a preferred embodiment, the first connection member 101 and the second connection member 102 (of the chair-drive interface assembly 100) are configured to promote, at least in part, transmission (dispersal) of a movement force 700 from the drive assembly 200 across the first chair-connection member 901 and the second chair-connection member 902 of the wheelchair assembly 900. In accordance with a preferred embodiment, the first connection member 101 and the second connection member 102 and the third connection member 103 (of the chair-drive interface assembly 100) also configured to prevent, at least in part, the drive assembly 200 from imparting, at least in part, a force that structurally weakens, at least in part, the chair-drive interface assembly 100 and/or structurally weakens, at least in part, the wheelchair assembly 900.

Referring to the embodiment as depicted in FIG. 5, the drive assembly 200 is configured to move, once activated, along a movement direction 107.

Figure 8:
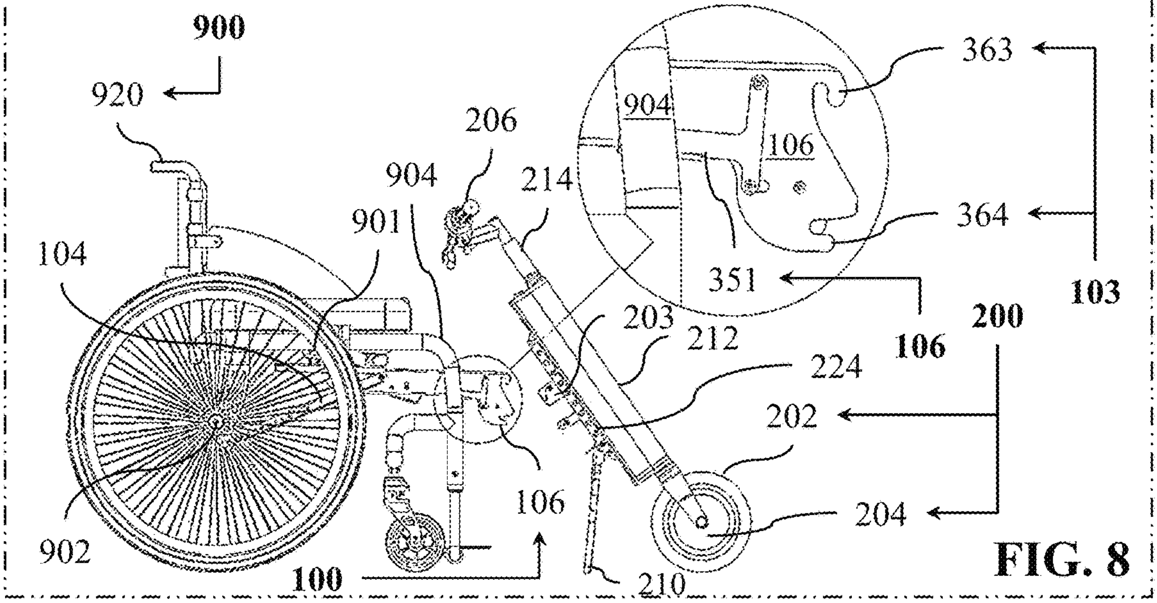
Figure 9:
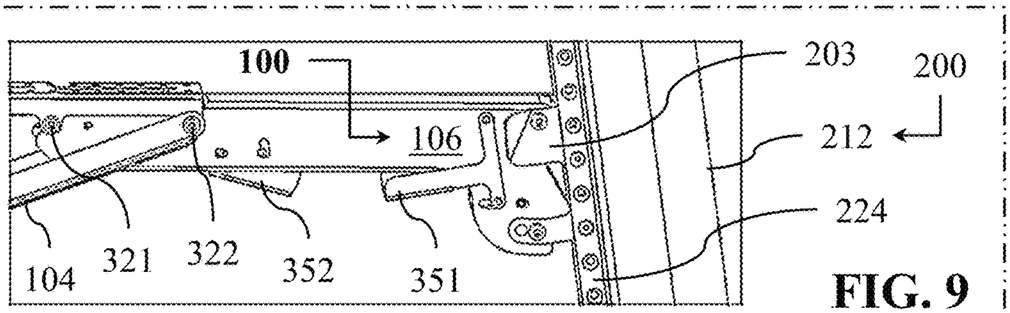
Figure 10:
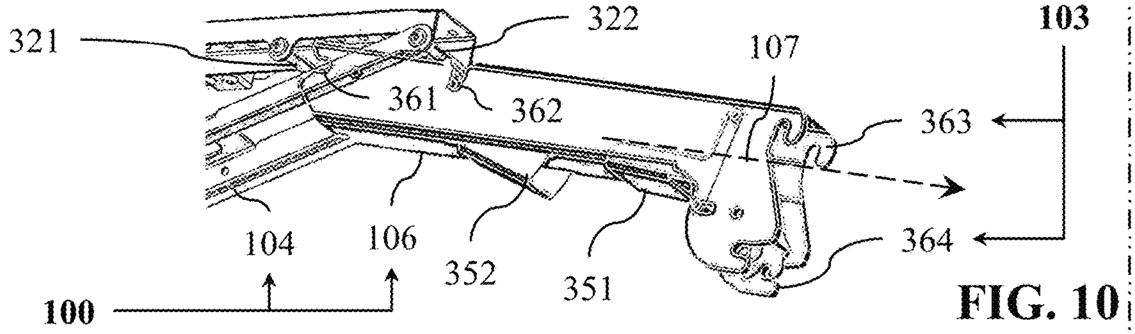

Referring to the embodiments as depicted in FIG. 5, FIG. 8, FIG. 9 and FIG. 10, the chair-drive interface assembly 100 includes (preferably) an adaptor assembly 104 (also called an adaptor module) and a docking assembly 106 (also called a docking module). The adaptor assembly 104 and the docking assembly 106 are configured to be selectively attachable (fixedly, securely) with each other (as previously described). More specifically (and in accordance with a preferred embodiment), the adaptor assembly 104 and the docking assembly 106 are configured to be selectively attachable (fixedly, securely) with each other, and selectively detachable from each other (as depicted in FIG. 9, FIG. 10, FIG. 12 and FIG. 13) between an attached condition (attached arrangement, fixedly, securely attached condition, as depicted in FIG. 9), and a detached condition (a detached arrangement or an unlatched arrangement, as depicted in FIG. 10). It will be appreciated that "selectively attachable" means configured to be tailor fitted to accommodate a wide range of wheelchair assembly 900 types and sizes for users with different disabilities to fit the wheelchair assembly 900 and the drive assembly 200, such as (A) to fit the wheelchair assembly 900 and the drive assembly 200 closer together to each other, (B) to fit the wheelchair assembly 900 and the drive assembly 200 further apart from each other, (C) to adjust for various heights of the drive assembly 200, (D) to adjust for various alignments of the drive assembly 200 relative to the wheelchair assembly 900.

Referring to the embodiment as depicted in FIG. 5, the docking assembly 106 is configured to extend mobility for a wheelchair assembly 900. The wheelchair assembly 900 may include, for instance, a manual wheelchair of which another embodiment is depicted in FIG. 1. The docking assembly 106 is configured to be fixedly attached to the wheelchair assembly 900. The docking assembly 106 is also configured to be selectively attached to, and selectively detached from, the drive assembly 200 (of which another embodiment is depicted in FIG. 1). For instance, the docking assembly 106 is, preferably, also configured to include a click-type latch mechanism configured to permit selective attachment between, and selective detachment from (between), the docking assembly 106 and the drive assembly 200. Once the docking assembly 106 is selectively attached to the wheelchair assembly 900 and to the drive assembly 200, the wheelchair assembly 900 is converted into a powered wheelchair (preferably the wheelchair is powered by the application of electrical energy to the drive assembly 200). The docking assembly 106 is configured to make the wheelchair assembly 900 relatively easier to be used by a user. The docking assembly 106 provides, preferably, a compact configuration (arrangement), while maintaining comfortable operation (for the user), such as while the powered wheelchair is utilized in narrow or crowded places. The docking assembly 106 is (preferably) configured to be, at least in part, quickly (easily) detached from the drive assembly 200 and stowed away when no longer needed by the user. The docking assembly 106 is, preferably, made of light-weight materials. It is preferred that connections are fastened tightly and are not damaged before using the combination of the docking assembly 106, the drive assembly 200 and the wheelchair assembly 900.

Referring to the embodiment as depicted in FIG. 5, it will be appreciated that the adaptor assembly 104 may include components (sections) that are connected with each other, and assembled by fasteners, etc., for forming the adaptor assembly 104.

It will be appreciated that the docking assembly 106 may include components (sections) that are connected with each other, and assembled by fasteners, connectors, etc., for forming (or installing) the docking assembly 106.

Referring to the embodiment as depicted in FIG. 5, the adaptor assembly 104 is configured to be selectively connectable to (and selectively disconnectable from) the docking assembly 106. The adaptor assembly 104 is configured to be connectable to (affixed to) the frame assembly 904 of the wheelchair assembly 900. The docking assembly 106 is configured to be selectively connectable to (and selectively disconnectable from) the drive assembly 200. This is done in such a way that the docking assembly 106, in use, maintains the position of the drive assembly 200 in a fixed relationship with the frame assembly 904 of the wheelchair assembly 900. This is done once (A) the adaptor assembly 104 is connected (securely connected or affixed) to the frame assembly 904 of the wheelchair assembly 900, and (B) the adaptor assembly 104 is selectively connected to the docking assembly 106, and (C) the docking assembly 106 is selectively connected to the drive assembly 200.

Referring to the embodiment as depicted in FIG. 5, the drive assembly 200 has a distance range of about 25 kilometers (km) or about 16 miles for each full charge of the battery assembly 208 (once the drive assembly 200 is connected to the chair-drive interface assembly 100 (interface system) and the wheelchair assembly 900). The adaptor assembly 104 has a weight (preferably) of about 0.8 kilograms or about 1.8 pounds. The combined weight of the wheelchair assembly 900 and the user may be (preferably) less than about 280 pounds or about 130 kilograms.

Referring to the embodiment as depicted in FIG. 5, the docking assembly 106 may be configured for utilization with rigid types (models) of the wheelchair assembly 900 that have the second chair-connection member 902 and the first chair-connection member 901. The first chair-connection member 901 has a diameter ranging from about 23 millimeters to about 28 millimeters. The second chair-connection member 902 (preferably) has a diameter ranging from about 23 to about 28 millimeters. The first chair-connection member 901 and the second chair-connection member 902 (bars, tubes, etc.) are configured to allow (permit) the docking assembly 106 to be selective attached to (and selectively detachable from) the wheelchair assembly 900.

Referring to the embodiments as depicted in FIG. 16 and FIG. 17, the adaptor assembly 104 and the wheelchair assembly 900 are configured to be selectively (fixedly, securely attachable) attachable to each other, and selectively detachable from each other between an attached condition (attached arrangement or a fixedly securely attached condition, as depicted in FIG. 16 or FIG. 17) and a detached condition (a detached arrangement or an unlatched arrangement, as depicted in FIGS. 18 to 22).

Figure 6:
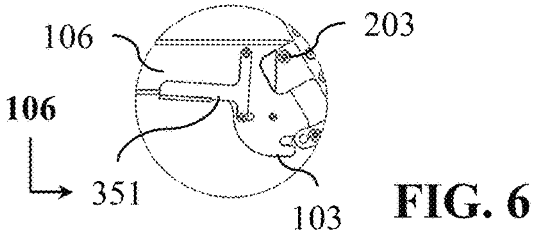
Figure 7:
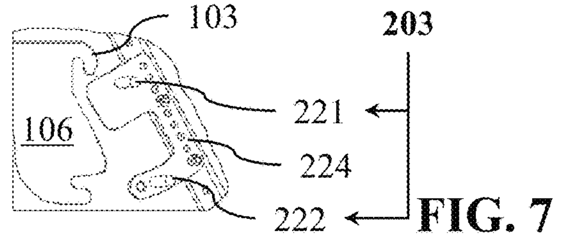

Referring to the embodiments as depicted in FIG. 5, FIG. 6, FIG. 7, FIG. 8, FIG. 9 and FIG. 10, the docking assembly 106 and the drive assembly 200 are configured to be selectively (fixedly, securely) attachable to each other, and selectively detachable from each other between an attached condition (attached arrangement or a fixedly securely attached condition, as depicted in FIG. 5, FIG. 6 and FIG. 9) and a detached condition (a detached arrangement or an unlatched arrangement, as depicted in FIG. 7, FIG. 8 and FIG. 10).

Referring to the embodiments as depicted in FIG. 6, FIG. 8, FIG. 9, FIG. 10, FIG. 11, FIG. 12 and FIG. 13, the docking assembly 106 includes (preferably) a first latch assembly 351 (a front latch) and a second latch assembly 352 (a rear latch). The first latch assembly 351 and the second latch assembly 352 are spaced apart from each other. The first latch assembly 351 and the second latch assembly 352 are mounted to the docking assembly 106. The cross-sectional views of FIG. 12 and FIG. 13 are taken along a cross-sectional line B-B (as depicted FIG. 11).

Referring to the embodiments as depicted in FIG. 9 and FIG. 10, the first latch assembly 351 is configured to selectively attach (latch) the docking assembly 106 to the drive assembly 200 (such as with the drive-connection member 203 of the drive assembly 200). The drive-connection member 203 is configured to be mountable to a portion of the rail-mounting assembly 224, as depicted in FIG. 9. The first latch assembly 351 is also configured to selectively detach (delatch, decouple or disconnect) the docking assembly 106 from the drive assembly 200 (such as from the drive-connection member 203 of the drive assembly 200, as depicted in FIG. 10). The drive-connection member 203 is configured to be mountable (fixedly mountable to, or selectively mountable to) the rail-mounting assembly 224, as depicted in FIG. 9.

Referring to the embodiments as depicted in FIG. 9 and FIG. 10, the second latch assembly 352 is configured to selectively attach (latch) the docking assembly 106 with the adaptor assembly 104 (such as, with the first axle 321 of the adaptor assembly 104). The first axle 321 is mounted to a portion of the adaptor assembly 104, as depicted in FIG. 9. The second latch assembly 352 is also configured to selectively detach (delatch, decouple or disconnect) the docking assembly 106 from the adaptor assembly 104 (such as, from the first axle 321 of the adaptor assembly 104). The first axle 321 is mounted to a portion of the adaptor assembly 104, as depicted in FIG. 10.

Figure 18:
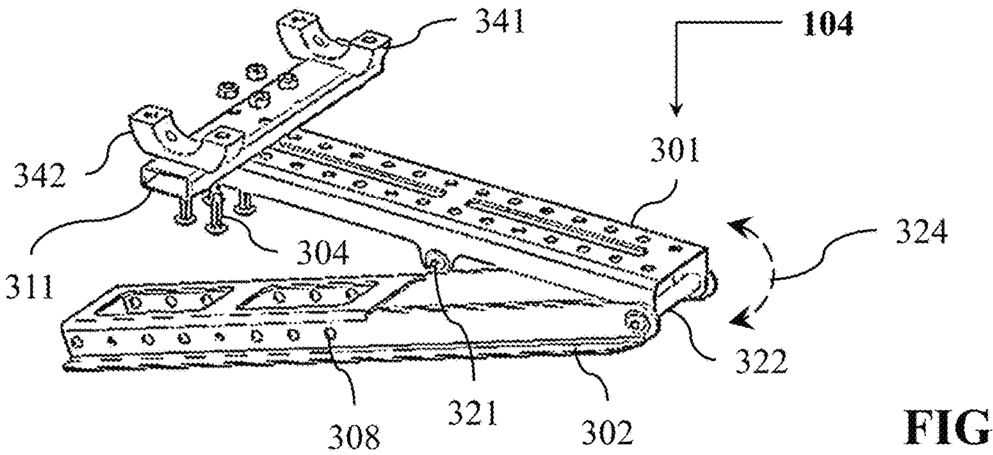

Referring to the embodiments as depicted in FIG. 16, FIG. 17 and FIG. 18, the adaptor assembly 104 includes a first bracket assembly 301 and a second bracket assembly 302. The first bracket assembly 301 and the second bracket assembly 302 are pivotally attached to (with) each other. The adaptor assembly 104 further includes a first axle 321 and a second axle 322. The first bracket assembly 301 and the second bracket assembly 302 are pivotally attached to (with) each other at the second axle 322. The first axle 321 is configured to selectively connect to (as depicted in FIG. 9), and disconnect from (as depicted in FIG. 10), a portion (such as the first engagement feature 361) of the docking assembly 106. The first axle 321 and the second axle 322 are spaced apart from each other. The first axle 321 spans across opposite lateral sides of the first bracket assembly 301 and the second bracket assembly 302. The second axle 322 spans across opposite lateral sides of the first bracket assembly 301 and the second bracket assembly 302.

Referring to the embodiments as depicted in FIG. 10, FIG. 11, FIG. 12 and FIG. 13, the docking assembly 106 includes a first engagement feature 361 and a second engagement feature 362. The cross-sectional views of FIG. 12 and FIG. 13 are taken along a cross-sectional line B-B (as depicted FIG. 11). The first engagement feature 361 and the second engagement feature 362 are spaced apart from each other. The first engagement feature 361 is configured to selectively connect to (with) a portion of (such as the first axle 321) of the adaptor assembly 104 (as depicted in FIG. 9). The first engagement feature 361 is configured to selectively disconnect from a portion of (such as the first axle 321) of the adaptor assembly 104 (as depicted in FIG. 10). The second engagement feature 362 is configured to selectively connect to (with) a portion (such as the second axle 322) of the adaptor assembly 104 (as depicted in FIG. 9). The second engagement feature 362 is configured to selectively disconnect from a portion (such as the second axle 322) of the adaptor assembly 104 (as depicted in FIG. 10).

Referring to the embodiments as depicted in FIG. 8, FIG. 10, FIG. 11, FIG. 12 and FIG. 13, the docking assembly 106 includes a third engagement feature 363 and a fourth engagement feature 364. The third engagement feature 363 and the fourth engagement feature 364 are spaced apart from each other. The third engagement feature 363 is configured to selectively connect to (with) a portion (such as the drive-connection member 203) of the drive assembly 200 (as depicted in FIG. 9). The third engagement feature 363 is configured to selectively connect to, and selectively disconnect from a drive connection member 203 of the drive assembly 200. The third engagement feature 363 is configured to selectively disconnect from a portion (such as the drive-connection member 203) of the drive assembly 200 (as depicted in FIG. 10). The fourth engagement feature 364 is configured to selectively connect to (with) a portion (such as the second axle 322) of the adaptor assembly 104 (as depicted in FIG. 9). The fourth engagement feature 364 is configured to selectively connect to, selectively disconnect from the drive connection member 203 of the drive assembly 200. The fourth engagement feature 364 is configured to selectively disconnect from a portion (such as the first axle 321) of the adaptor assembly 104 (as depicted in FIG. 10).

Referring to the embodiment as depicted in FIG. 12, the docking assembly 106 includes an elongated body member 310, a first latch 353 and a second latch body 354. The cross-sectional view of FIG. 12 is taken along a cross-sectional line B-B (as depicted FIG. 11). The first latch 353 and the second latch body 354 are spaced apart from each other, and are mounted to spaced apart sections of the elongated body member 310. The elongated body member 310 is configured to support the first latch 353. The elongated body member 310 is configured to support the second latch body 354. The first latch 353 is configured to be movable (pivotally movable, such as along a latch-movement direction 356). The second latch body 354 is configured to be movable (pivotally movable, such as along a latch-movement direction 356).

Referring to the embodiments as depicted in FIG. 16, FIG. 19, FIG. 20, FIG. 21 and FIG. 22, the adaptor assembly 104 includes a third bracket assembly 303. The third bracket assembly 303 is configured to be fixedly connected (selectively fixedly connected) to the second bracket assembly 302. The third bracket assembly 303 is configured to be fixedly connected (selectively fixedly connected) to the second bracket assembly 302 at a selected portion of the second bracket assembly 302. This is done in such a way that the third bracket assembly 303 is adjustably mountable to the second bracket assembly 302 (at predetermined locations positioned along a length of the second bracket assembly 302).

Referring to the embodiment as depicted in FIG. 16, a first fixed connector 331 and a second fixed connector 332 are configured to attach (securely attach) the third bracket assembly 303 to the second bracket assembly 302. It will be appreciated that the first fixed connector 331 and a second fixed connector 332 may include head screws and split lock washers, etc., and any equivalent thereof.

Referring to the embodiments as depicted in FIG. 17, FIG. 18, FIG. 19 and FIG. 20, the third bracket assembly 303 defines (provides) a plurality of connection holes 308 along opposite lateral side portions of the third bracket assembly 303. The plurality of connection holes 308 extends along a length (a lineal length) of the third bracket assembly 303. The plurality of connection holes 308 is configured to (A) permit the first fixed connector 331 and a second fixed connector 332 to be received therein, and/or (B) facilitate secured attachment between the third bracket assembly 303 and the second bracket assembly 302. The third bracket assembly 303 defines available connections provided by a plurality of connection holes 308 positioned along opposite lateral side portions of the third bracket assembly 303. The plurality of connection holes 308 of the third bracket assembly 303 is configured to facilitate custom fitting of the adaptor assembly 104 between the first chair-connection member 901 and the second chair-connection member 902 of the wheelchair assembly 900. The plurality of connection holes 308 extends along a length of the third bracket assembly 303. The plurality of connection holes 308 is configured to permit a first fixed connector 331 and a second fixed connector 332 to be received therein, and facilitate secured attachment between the third bracket assembly 303 and the second bracket assembly 302.

Referring to the embodiments as depicted in FIG. 16, FIG. 17 and FIG. 18, the adaptor assembly 104 further includes a first elongated member 311 and a second elongated member 312.

Referring to the embodiments as depicted in FIG. 16, FIG. 17 and FIG. 18, the first elongated member 311 is configured to be fixedly attached along a length of the first chair-connection member 901 of the wheelchair assembly 900. The opposite end portions (opposite end sections) of the first elongated member 311 are configured to be fixedly attached at opposite end portions of a length of the first chair-connection member 901 of the wheelchair assembly 900. A first collar 341 and a second collar 342 are each configured to connect (fixedly connect) respective opposite end portions (respective opposite end sections) of the first elongated member 311. This is done in such a way that the first elongated member 311 may be fixedly attached at the opposite end portions of a length of the first chair-connection member 901 of the wheelchair assembly 900. The first collar 341 and the second collar 342 each have screws mounted thereto configured to be rotated by a tool, such as an allen key, etc. For the case where the inner diameter of the first collar 341 and the second collar 342 are too large for the tubing members, a strip of rubber material may be positioned therebetween, etc.

Referring to the embodiments as depicted in FIG. 16, FIG. 17 and FIG. 18, the second elongated member 312 is configured to be fixedly attached along a length of the second chair-connection member 902 of the wheelchair assembly 900. The opposite end portions (opposite end sections) of the second elongated member 312 are configured to be fixedly attached at opposite end portions of a length of the second chair-connection member 902 of the wheelchair assembly 900. A third collar 343 and a fourth collar 344 are each configured to connect (fixedly connect) respective opposite end portions (respective opposite end sections) of the second elongated member 312. This is done in such a way that the second elongated member 312 may be fixedly attached at the opposite end portions of a length of the second chair-connection member 902 of the wheelchair assembly 900.

Referring to the embodiment as depicted in FIG. 18, the first elongated member 311 is configured to be fixedly attached (connected) to a central portion of an end section of the first bracket assembly 301. Once the first bracket assembly 301 is attached to the first chair-connection member 901 of the wheelchair assembly 900, the first bracket assembly 301 is aligned parallel to the bottom surface of the seat assembly 910 of the working surface 800 (as depicted in FIG. 5). A connector 304 is configured to fixedly and securely attach the first elongated member 311 to the central portion of the end section of the first bracket assembly 301.

Referring to the embodiment as depicted in FIG. 18, the first bracket assembly 301 and the second bracket assembly 302 are configured to be pivotally movable relative to each other along a rotation movement 324.

Figure 19:
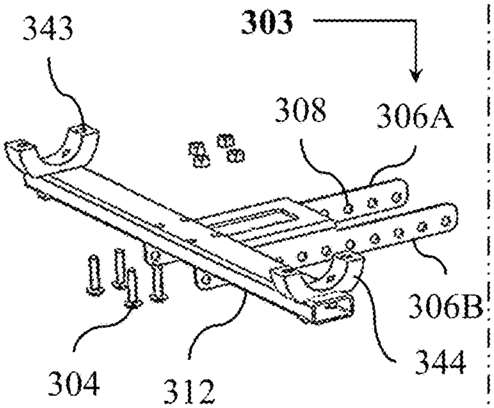

Referring to the embodiment as depicted in FIG. 19, the third bracket assembly 303 includes a pair of spaced-apart fingers (306A, 306B). The spaced-apart fingers (306A, 306B) are configured to be fixedly attached to the lateral side walls of the second bracket assembly 302 (as depicted in FIG. 16).

De-Installation of Chair-Drive Interface Assembly 100

The manner or arrangements for removal of (some of the components of) the chair-drive interface assembly 100 from the wheelchair assembly 900 and the drive assembly 200 is described below.

Referring to the embodiments as depicted in FIG. 6, FIG. 7, FIG. 8 and FIG. 9, there is a sequence depicted for the detachment of the docking assembly 106 from the drive assembly 200. Initially, the docking assembly 106 is attached to the drive assembly 200 (as depicted in FIG. 6). The third connection member 103 (extending from the docking assembly 106) is detached (preferably) from the drive-connection member 203 of the drive assembly 200 (as depicted in FIG. 7). The drive-connection member 203 includes spaced-apart lateral pins (that is, the first drive connector 221 and the second drive connector 222) extending between the opposite rails of the rail-mounting assembly 224 (as depicted in FIG. 7). The third connection member 103 includes hook-shaped members configured to engage with the drive-connection member 203 (such as the spaced-apart lateral pins), as depicted in FIG. 7. The first latch assembly 351 normally prevents disengagement between the third connection member 103 and the drive-connection member 203 (as depicted in FIG. 9). The first latch assembly 351 is disengaged (by the user) to release the third connection member 103 from the drive-connection member 203 (as depicted in FIG. 8). Once released, the drive assembly 200 may be moved away from the docking assembly 106 (as depicted in FIG. 8). The drive assembly 200 may be positioned in a standing position with assistance from the drive stand 210.

Referring to the embodiment as depicted in FIG. 9 and FIG. 10, there is a sequence depicted for the detachment of the docking assembly 106 from the adaptor assembly 104. The second latch assembly 352 is configured to normally maintain the docking assembly 106 and the adaptor assembly 104 latched together (with each other). Once the docking assembly 106 is detached from the drive assembly 200, the second latch assembly 352 is engaged to release the docking assembly 106 from the adaptor assembly 104 (as depicted in FIG. 9). Specifically, the second engagement feature 362 of the docking assembly 106 is released from (delatched from) the second axle 322 of the adaptor assembly 104 (as depicted in FIG. 10). The docking assembly 106 is pulled along the movement direction 107 in such a way that the first engagement feature 361 of the docking assembly 106 becomes disengaged from the first axle 321 of the adaptor assembly 104 (as depicted in FIG. 10). Once the docking assembly 106 is removed from the adaptor assembly 104, the user may store the docking assembly 106 (such as, in the trunk of a vehicle, etc., along with the drive assembly 200, etc.).

Referring to the embodiment as depicted in FIG. 16 and FIG. 17, there is a sequence depicted for the deattachment (fixed attachment) of the adaptor assembly 104 from the wheelchair assembly 900. It will be appreciated that once the adaptor assembly 104 is installed to the wheelchair assembly 900, the user is not required to detach the adaptor assembly 104 from the wheelchair assembly 900. The third bracket assembly 303 is attached to the first chair-connection member 901 (as depicted in FIG. 16). Preferably, the third collar 343 and the fourth collar 344 attach the second elongated member 312 (which is affixed to the third bracket assembly 303) to the first chair-connection member 901 (as depicted in FIG. 16). The first bracket assembly 301 is attached to the first chair-connection member 901 (as depicted in FIG. 17). Preferably, the first collar 341 and the second collar 342 attach the first elongated member 311 (which is affixed to the first bracket assembly 301) to the second chair-connection member 902 (as depicted in FIG. 16 or FIG. 17). Once the third bracket assembly 303 is attached to the first chair-connection member 901, and the first bracket assembly 301 is attached to the first chair-connection member 901, then the first bracket assembly 301 is attached to the third bracket assembly 303. The first fixed connector 331 and the second fixed connector 332 may be positioned along a length of the third bracket assembly 303 as needed to properly fit the third bracket assembly 303 with the first bracket assembly 301 (so that the fit is achieved between the adaptor assembly 104 and the wheelchair assembly 900, as may be desired).

Construction and Installation of Chair-Drive Interface Assembly 100

The manner or arrangement for construction of the chair-drive interface assembly 100 is described below.

Figure 20:
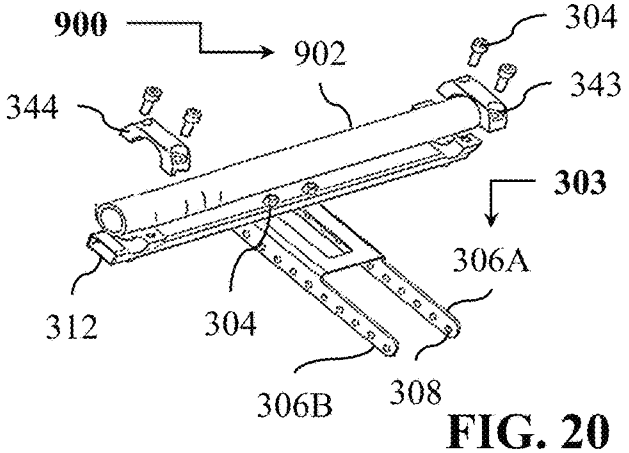
Figure 21:
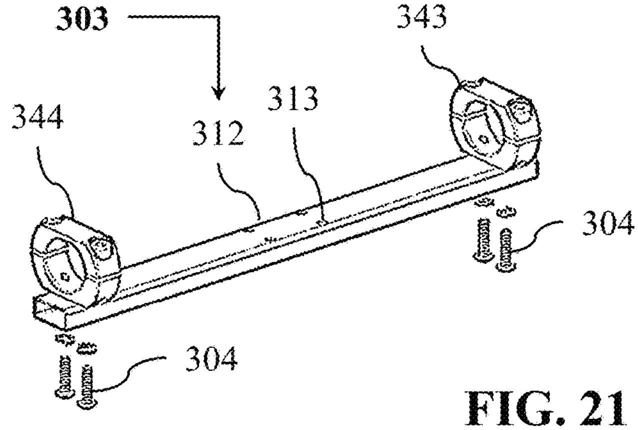
Figure 22:
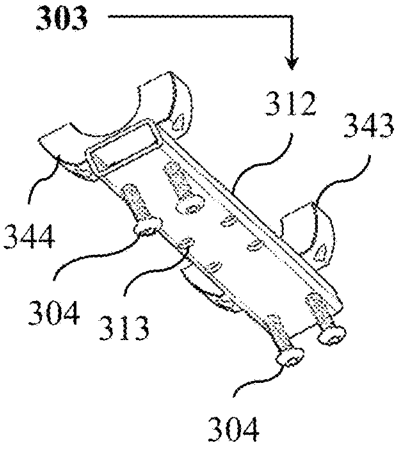

Referring to the embodiments as depicted in FIG. 21 (depicting a top perspective view) and FIG. 22 (depicting a bottom perspective view), the third collar 343 and the fourth collar 344 are installed (fixedly installed) onto (to) the opposite end sections of the second elongated member 312. For instance, connectors 304 are configured to fixedly attach the third collar 343 and the fourth collar 344 to the opposite end sections of the second elongated member 312. A central section (positioned between the opposite end sections) of the second elongated member 312 provides (defines) a passageway 313 configured to receive a connector 304, so that the connector 304 may connect the second elongated member 312 onto (to) an end section of the third bracket assembly 303 (as depicted in FIG. 19 and FIG. 20).

Referring to the embodiments as depicted in FIG. 19 (depicting a rear front perspective view) and FIG. 20 (depicting a top front perspective view), the third collar 343 and the fourth collar 344 are configured to be installed to a length of the second chair-connection member 902. The central section of the second elongated member 312 is configured to be fixedly connected to the end section of the third bracket assembly 303 (as depicted in FIG. 19 and FIG. 20). The spaced-apart fingers (306A, 306B) of the third bracket assembly 303 extend from the central section of the second elongated member 312.

Referring to the embodiments as depicted in FIG. 18 (depicting a top side perspective view), the first bracket assembly 301 and the second bracket assembly 302 are pivotally attached to each other at the second axle 322 (also called a pivot element). More specifically, the end portions of the first bracket assembly 301 and the second bracket assembly 302 are pivotally attached to each other at the second axle 322. The first collar 341 and the second collar 342 are fixedly attached to the opposite end sections of the first elongated member 311. The central section of the first elongated member 311 is fixedly attached to an end section of the first bracket assembly 301.

Referring to the embodiments as depicted in FIG. 17 (depicting a side perspective view), the first collar 341 and the second collar 342 are fixedly attached to a length of the first chair-connection member 901.

Referring to the embodiments as depicted in FIG. 16 (depicting a side perspective view), the third bracket assembly 303 and the second bracket assembly 302 are fixedly attached to each other. The first fixed connector 331 and the second fixed connector 332 are used to fixedly connect the third bracket assembly 303 and the second bracket assembly 302 together. More specifically, the first fixed connector 331 and the second fixed connector 332 are used to fixedly connect the spaced-apart fingers (306A, 306B) of the third bracket assembly 303 to the second bracket assembly 302. The spaced-apart fingers (306A, 306B) fit and receive (are placed on opposite lateral side sections of) the second bracket assembly 302.

Referring to the embodiments as depicted in FIG. 16, a preferred order of installation of the chair-drive interface assembly 100 is as follows: (A) the first bracket assembly 301 is installed onto (to) the first chair-connection member 901, and (B) the third bracket assembly 303 is installed onto (to) the second chair-connection member 902, and (C) the third bracket assembly 303 and the second bracket assembly 302 are fixedly attached to each other.

Figure 23:
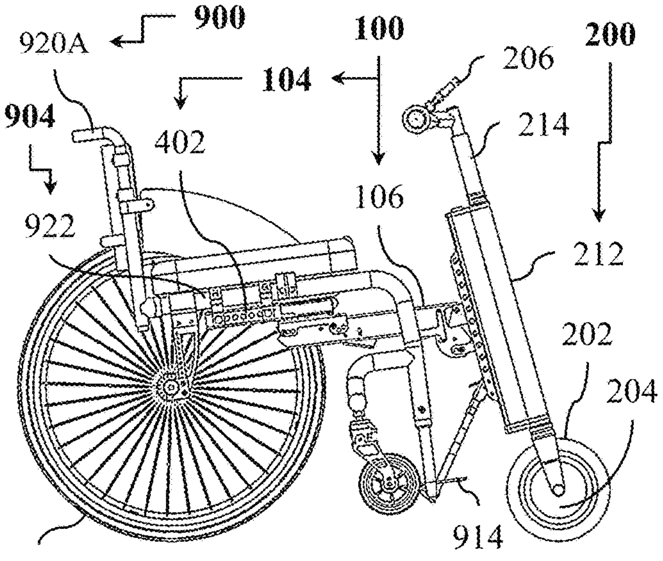
FIG. 23 to FIG. 28 depict a cross-sectional side view (FIG. 23), bottom views (FIG. 4, FIG. 25 and FIG. 26) and perspective top side views (FIG. 27 and FIG. 28) of embodiments of a chair-drive interface assembly (for use with the wheelchair assembly of FIG. 1).
Figure 24:
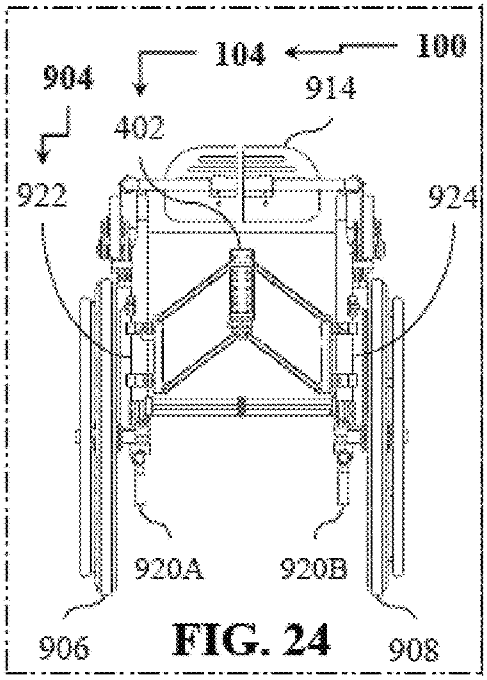
Figure 25:
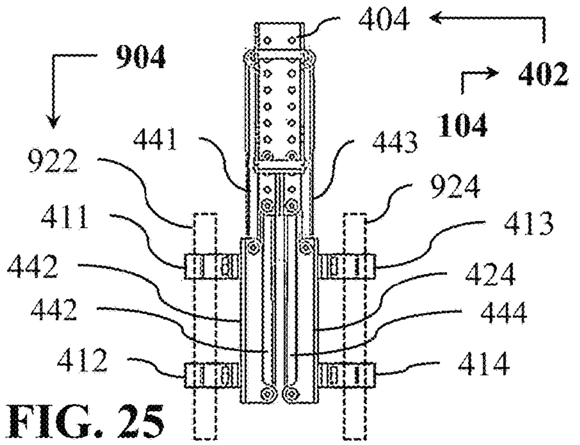
Figure 27:
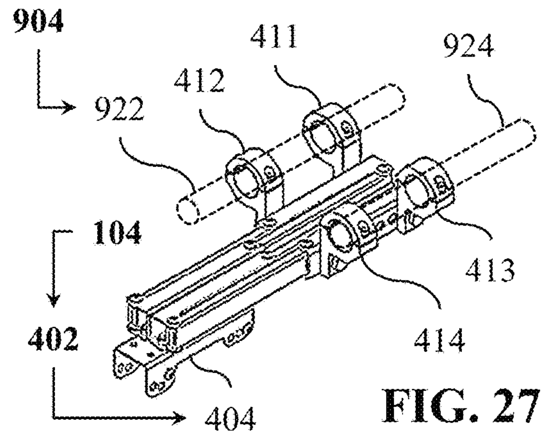
Figure 26:
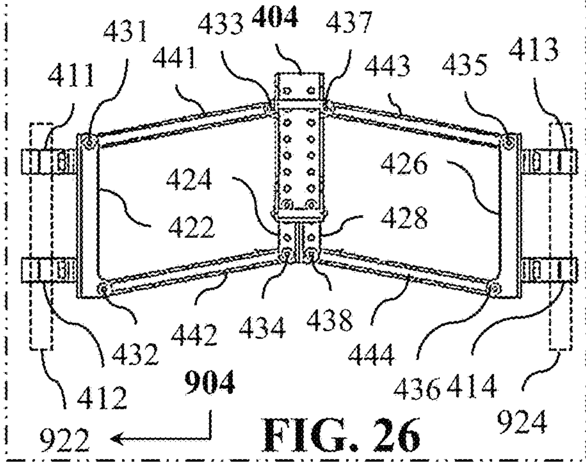
Figure 28:
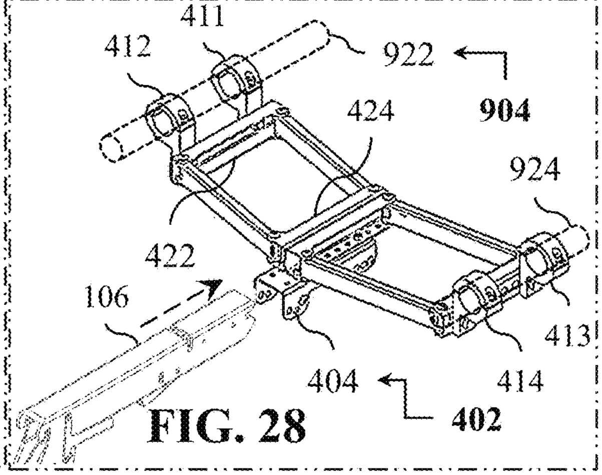

FIG. 23 to FIG. 28 depict embodiments of the chair-drive interface assembly 100 and the adaptor assembly 104 for the case where the wheelchair assembly 900 is configured to be foldable (into a folded condition or a storage condition, not shown and known to those skilled in the art). The wheelchair assembly 900 is also configured to be foldable into an unfolded condition or a deployed condition (as depicted in FIG. 23 or FIG. 24). For the case where the wheelchair assembly 900 is configured to be foldable, the adaptor assembly 104 is configured to be fixedly attached to the wheelchair assembly 900. The adaptor assembly 104 is also configured to be foldable into the folded condition (as depicted in FIG. 25 and FIG. 27). The adaptor assembly 104 is also configured to be foldable into the unfolded condition (as depicted in FIG. 26 and FIG. 28). It will be appreciated that a lock mechanism (known and not depicted) may be installed to the adaptor assembly 104 once the adaptor assembly 104 is positioned in the unfolded condition (as depicted in FIG. 24) to prevent unwanted or inadvertent collapsing of the adaptor assembly 104, etc. FIG. 23 is a cross-sectional side view of the wheelchair assembly 900 (similar to the view of FIG. 5). FIG. 24 is a bottom view of the wheelchair assembly 900 and the chair-drive interface assembly 100 of FIG. 23. It will be appreciated that there is no continuous axel that extends between the wheels (906, 908). The wheels (906, 908) are mounted to opposite sides of the frame assembly 904. The frame assembly 904 is foldable by known means (not fully depicted and known to those skilled in the art). For instance, an X-connector is configured to fold similar to the action of scissors. The foot-rest assembly 914 includes two separate foot rests that may be selectively separated from each other (when the wheelchair 900 becomes folded), etc. The chair-drive interface assembly 100 (specifically, the adaptor assembly 104) is configured to be fixedly attached to side-to-side spaced-apart side frame members (922, 924). The chair-drive interface assembly 100 (specifically, the adaptor assembly 104) is also configured to be movable between the folded condition and the unfolded condition of the wheelchair assembly 900. In accordance with a preferred embodiment, the wheelchair assembly 900 is configured to be foldable into the folded condition, and is also configured to be unfolded into the unfolded condition; the wheelchair assembly 900 includes side-to-side spaced-apart side frame members (922, 924) respectively positioned, and aligned parallel to, adjacently positioned chair wheels (906, 908) of the wheelchair assembly 900; the side-to-side spaced-apart side frame members (922, 924) are configured to be movable between the folded condition and the unfolded condition of the wheelchair assembly 900; the chair-drive interface assembly 100 includes an adaptor assembly 104 configured to be selectively attachable to, and selectively detachable from, the wheelchair assembly 900; and the chair-drive interface assembly 100 also includes a docking assembly 106 configured to be selectively attachable to, and selectively detachable from, the drive assembly 200; and the adaptor assembly 104 is also configured to be movable between the folded condition and the unfolded condition of the wheelchair assembly 900 in such a way that the adaptor assembly 104 remains attached to the wheelchair assembly 900 in the folded condition and in the unfolded condition of the wheelchair assembly 900. More preferably, the adaptor assembly 104 is configured to be selectively attachable to, and selectively detachable from, the side-to-side spaced-apart side frame members (922, 924) of the wheelchair assembly 900; and the adaptor assembly 104 is also configured to be movable between the folded condition and the unfolded condition of the wheelchair assembly 900 in such a way that the adaptor assembly 104 remains attached to the side-to-side spaced-apart side frame members (922, 924) of the wheelchair assembly 900 in the folded condition and in the unfolded condition of the wheelchair assembly 900.

FIG. 25 is a bottom side view of the adaptor assembly 104 of FIG. 24, in which the adaptor assembly 104 is placed in a folded condition (a storage condition) after the wheelchair assembly 900 has been folded (and stored, etc.). FIG. 26 is a bottom side perspective view of the adaptor assembly 104 of FIG. 24, in which the adaptor assembly 104 is placed in a deployed condition (for utilization by the user). FIG. 27 is a perspective top side view of the adaptor assembly 104 of FIG. 24, in which the adaptor assembly 104 is placed in a folded condition (a storage condition). FIG. 28 is a perspective top side view of the adaptor assembly 104 of FIG. 24, in which the adaptor assembly 104 is placed in a deployed condition (for utilization by the user), and in which the docking assembly 106 may be installed to the adaptor assembly 104.

Referring to the embodiments as depicted in FIG. 23 and FIG. 24, the wheelchair assembly 900 is configured to be folded into a folded condition (storage condition, not shown and known). The chair-drive interface assembly 100 is configured to be installed to the wheelchair assembly 900, and the wheelchair assembly 900 is configured to be foldable (for storage purposes), preferably, while the chair-drive interface assembly 100 remains installed to the wheelchair assembly 900.

Referring to the embodiment as depicted in FIG. 23, the chair-drive interface assembly 100 includes the adaptor assembly 104 and the docking assembly 106.

Referring to the embodiment as depicted in FIG. 24, the frame assembly 904 includes side-to-side spaced-apart side frame members (922, 924). It will be appreciated that (as depicted in FIG. 24) the side-to-side frame members (922, 924) are depicted in the unfolded condition (the deployed condition, ready for utilization by the user), with the chair wheels (906, 908) positioned farther away from each other. In the folded condition or the storage condition (as depicted in FIG. 25 and FIG. 27), the side-to-side frame members (922, 924) are positioned relatively closer to each other, with the chair wheels (906, 908) also positioned relatively closer to each other. In the unfolded condition or the deployed condition (as depicted in FIG. 26 and FIG. 28), the side-to-side frame members (922, 924) are positioned relatively farther away from each other, with the chair wheels (906, 908) also positioned relatively farther away from each other. The seat of the wheelchair assembly 900 may span across, or straddle, the side-to-side frame members (922, 924), as depicted in FIG. 23 and FIG. 24. Spaced-apart handlebars 920 (920A, 920B) are positioned, respectively, on the side-to-side frame members (922, 924), as depicted in FIG. 24.

Referring to the embodiment as depicted in FIG. 25, the adaptor assembly 104 includes a foldable bracket assembly 402. The foldable bracket assembly 402 is configured to be selectively attached to the docking assembly 106 (as depicted in FIG. 23 and FIG. 28) after the wheelchair assembly 900 is unfolded, or deployed, for usage (by the user).

Referring to the embodiment as depicted in FIG. 24, the foldable bracket assembly 402 is configured to be fixedly connected to the side-to-side frame members (922, 924) of the frame assembly 904. The foldable bracket assembly 402 is configured to be foldable once, or while, the wheelchair assembly 900 is folded for storage purposes; this is done, preferably without having to remove the foldable bracket assembly 402 from the wheelchair assembly 900 (as depicted in FIG. 24).

Referring to the embodiments as depicted in FIG. 25 and FIG. 28, the foldable bracket assembly 402 includes a base member 404 configured to be selectively connected to, and selectively detached from, the docking assembly 106.

Referring to the embodiment as depicted in FIG. 26, a first collar 411 and a second collar 412 are configured to be affixed to the side frame member 922 of the frame assembly 904. The first collar 411 and the second collar 412 are spaced apart from each other (after the first collar 411 and the second collar 412 are affixed to the side frame member 922). The first collar 411 and the second collar 412 are mounted to a first lateral member 422. A second lateral member 424 is affixed to (a first elongated side of) the base member 404. A first foldable member 441 is pivotally connected to the first lateral member 422 at a first pivot connection 431. The first foldable member 441 is pivotally connected to the second lateral member 424 at a third pivot connection 433. A second foldable member 442 is pivotally connected to the first lateral member 422 at a second pivot connection 432. The second foldable member 442 is pivotally connected to the second lateral member 424 at a fourth pivot connection 434.

Referring to the embodiment as depicted in FIG. 26, a third collar 413 and a fourth collar 414 are configured to be affixed to the side frame member 924 of the frame assembly 904. The third collar 413 and the fourth collar 414 are spaced apart from each other (after the third collar 413 and the fourth collar 414 are affixed to the side frame member 924). The third collar 413 and the fourth collar 414 are mounted to a third lateral member 426. A fourth lateral member 428 is affixed to (a second elongated side of) the base member 404. A third foldable member 443 is pivotally connected to the third lateral member 426 at a first pivot device 435. The third foldable member 443 is pivotally connected to the fourth lateral member 428 at a third pivot device 437. A fourth foldable member 444 is pivotally connected to the third lateral member 426 at a second pivot device 436. The fourth foldable member 444 is pivotally connected to the fourth lateral member 428 at a fourth pivot device 438.

Referring to the embodiments as depicted in FIG. 24 to FIG. 28, the wheelchair assembly 900 is configured to be foldable into a folded condition (known and not depicted), and is also configured to be unfolded into an unfolded condition (as depicted in FIG. 24). The wheelchair assembly 900 includes side-to-side spaced-apart side frame members (922, 924) respectively positioned, and aligned parallel to, adjacently positioned chair wheels (906, 908) of the wheelchair assembly 900 (as depicted in FIG. 24). The side-to-side spaced-apart side frame members (922, 924) are configured to be movable between the folded condition (as depicted in FIG. 25 and FIG. 27) and the unfolded condition (as depicted in FIG. 26 and FIG. 28) of the wheelchair assembly 900. The adaptor assembly 104 is configured to be fixedly attached to side-to-side spaced-apart side frame members (922, 924). The adaptor assembly 104 is configured to be movable between the folded condition (as depicted in FIG. 25 and FIG. 27) and the unfolded condition (as depicted in FIG. 26 and FIG. 28) of the wheelchair assembly 900.

The following is offered as further description of the embodiments, in which any one or more of any technical feature (described in the detailed description, the summary and the claims) may be combinable with any other one or more of any technical feature (described in the detailed description, the summary and the claims). It is understood that each claim in the claims section is an open ended claim unless stated otherwise. Unless otherwise specified, relational terms used in these specifications should be construed to include certain tolerances that the person skilled in the art would recognize as providing equivalent functionality. By way of example, the term perpendicular is not necessarily limited to 90.0 degrees, and may include a variation thereof that the person skilled in the art would recognize as providing equivalent functionality for the purposes described for the relevant member or element. Terms such as “about” and “substantially”, in the context of configuration, relate generally to disposition, location, or configuration that are either exact or sufficiently close to the location, disposition, or configuration of the relevant element to preserve operability of the element within the disclosure which does not materially modify the disclosure. Similarly, unless specifically made clear from its context, numerical values should be construed to include certain tolerances that the person skilled in the art would recognize as having negligible importance as they do not materially change the operability of the disclosure. It will be appreciated that the description and/or drawings identify and describe embodiments of the apparatus (either explicitly or inherently). The apparatus may include any suitable combination and/or permutation of the technical features as identified in the detailed description, as may be required and/or desired to suit a particular technical purpose and/or technical function. It will be appreciated that, where possible and suitable, any one or more of the technical features of the apparatus may be combined with any other one or more of the technical features of the apparatus (in any combination and/or permutation). It will be appreciated that persons skilled in the art would know that the technical features of each embodiment may be deployed (where possible) in other embodiments even if not expressly stated as such above. It will be appreciated that persons skilled in the art would know that other options may be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope may be defined by the claims. The written description and/or drawings may help to understand the scope of the claims. It is believed that all the crucial aspects of the disclosed subject matter have been provided in this document. It is understood, for this document, that the word “includes” is equivalent to the word “comprising” in that both words are used to signify an open-ended listing of assemblies, components, parts, etc. The term “comprising”, which is synonymous with the terms “including,” “containing,” or “characterized by,” is inclusive or open-ended and does not exclude additional, unrecited elements or method steps. Comprising (comprised of) is an “open” phrase and allows coverage of technologies that employ additional, unrecited elements. When used in a claim, the word “comprising” is the transitory verb (transitional term) that separates the preamble of the claim from the technical features of the disclosure. The foregoing has outlined the non-limiting embodiments (examples). The description is made for particular non-limiting embodiments (examples). It is understood that the non-limiting embodiments are merely illustrative as examples.

What is claimed is:

1. An apparatus for connection to, and use with, a wheelchair assembly having a first chair-connection member and a second chair-connection member spaced apart from the first chair-connection member, and the apparatus also for use with a drive assembly including a wheel assembly, a motor assembly, a drive-connection member and a steering assembly, in which the wheel assembly is configured to contact a working surface, and the motor assembly is configured to couple to the wheel assembly, and the motor assembly is also configured to rotate the wheel assembly, and the steering assembly is configured to couple to the wheel assembly, and is configured to steer the wheel assembly, the apparatus comprising:

a chair-drive interface assembly including:

a first connection member configured to be fixedly attached to the first chair-connection member; and a second connection member configured to be fixedly attached to the second chair-connection member, and in which the second connection member is spaced apart from the first connection member; and a third connection member configured to be fixedly attached to the drive-connection member of the drive assembly, in which the third connection member is spaced apart from the second connection member and from the first connection member, wherein the wheelchair assembly is configured to be foldable into a folded condition, and is also configured to be unfolded into an unfolded condition; and wherein the wheelchair assembly includes side-to-side spaced-apart side frame members respectively positioned, and aligned parallel to, adjacently positioned chair wheels of the wheelchair assembly; and wherein the side-to-side spaced-apart side frame members are configured to be movable between the folded condition and the unfolded condition of the wheelchair assembly; and the chair-drive interface assembly includes an adaptor assembly configured to be selectively attachable to, and selectively detachable from, the wheelchair assembly; and the chair-drive interface assembly also includes a docking assembly configured to be selectively attachable to, and selectively detachable from, the drive assembly; and the adaptor assembly is also configured to be movable between the folded condition and the unfolded condition of the wheelchair assembly in such a way that the adaptor assembly remains attached to the wheelchair assembly in the folded condition and in the unfolded condition of the wheelchair assembly.

2. The apparatus of claim 1, wherein:

the chair-drive interface assembly is configured to:

promote, at least in part, transmission of a movement force from the drive assembly across the first chair-connection member and the second chair-connection member of the wheelchair assembly; and prevent, at least in part, the drive assembly from imparting, at least in part, a force that structurally weakens, at least in part, the chair-drive interface assembly or structurally weakens, at least in part, the wheelchair assembly.

3. The apparatus of claim 1, wherein:

the adaptor assembly and the docking assembly are configured to be selectively attachable to each other, and selectively detachable from each other.

4. The apparatus of claim 1, wherein the docking assembly includes:

a first latch assembly; and a second latch assembly; and the first latch assembly and the second latch assembly are spaced apart from each other; and the first latch assembly is configured to selectively attach to, and selectively detach from, the drive-connection member of the drive assembly; and the second latch assembly is configured to selectively attach to, and selectively detach from, the adaptor assembly.

5. The apparatus of claim 1, wherein the adaptor assembly includes:
a first bracket assembly; and
a second bracket assembly; and
the first bracket assembly and the second bracket assembly are pivotally attached to each other.

6. The apparatus of claim 5, wherein the adaptor assembly includes:
a third bracket assembly; and
the third bracket assembly is configured to be fixedly connected to the second bracket assembly at a selected portion of the second bracket assembly in such a way that the third bracket assembly is adjustably mountable to the second bracket assembly at predetermined locations positioned along a length of the second bracket assembly.

7. The apparatus of claim 6, wherein:
the third bracket assembly defines available connections provided by a plurality of connection holes positioned along opposite lateral side portions of the third bracket assembly; and
the plurality of connection holes of the third bracket assembly is configured to facilitate custom fitting of the adaptor assembly between the first chair-connection member and the second chair-connection member of the wheelchair assembly; and
the plurality of connection holes extends along a length of the third bracket assembly; and
the plurality of connection holes is configured to permit a first fixed connector and a second fixed connector to be received therein, and facilitate secured attachment between the third bracket assembly and the second bracket assembly.

8. The apparatus of claim 5, wherein the adaptor assembly includes:
a first axle; and
a second axle; and
the first axle and the second axle are spaced apart from each other; and
the first axle spans across opposite lateral sides of the first bracket assembly and the second bracket assembly; and
the second axle spans across opposite lateral sides of the first bracket assembly and the second bracket assembly; and
the first bracket assembly and the second bracket assembly are pivotally attached to each other at the second axle; and
the first axle is configured to selectively connect to, and disconnect from, a first engagement feature of the docking assembly.

9. The apparatus of claim 1, wherein the docking assembly includes:
a first engagement feature; and
a second engagement feature; and
the first engagement feature and the second engagement feature are spaced apart from each other; and
the first engagement feature is configured to selectively connect to, and selectively disconnect from, the adaptor assembly; and
the second engagement feature is configured to selectively connect to, selectively disconnect from, the adaptor assembly.

10. The apparatus of claim 1, wherein the docking assembly includes:
a third engagement feature; and
a fourth engagement feature; and
the third engagement feature and the fourth engagement feature are spaced apart from each other; and
the third engagement feature is configured to selectively connect to, and selectively disconnect from, of a drive connection member of the drive assembly; and
the fourth engagement feature is configured to selectively connect to, selectively disconnect from the drive connection member of the drive assembly.

11. The apparatus of claim 1, wherein the docking assembly includes:
an elongated body member; and
a first latch; and
a second latch; and
the first latch and the second latch are spaced apart from each other, and are mounted to the elongated body member; and
the first latch is configured to be pivotally movable; and
the second latch is configured to be pivotally movable.

12. The apparatus of claim 1, wherein:
the adaptor assembly is configured to be adjustably custom-fitted between the first chair-connection member and the second chair-connection member of the wheelchair assembly.

13. The apparatus of claim 1, wherein the adaptor assembly further includes:
a first elongated member; and
the first elongated member is configured to be fixedly attached along a length of the first chair-connection member of the wheelchair assembly; and
a first collar and a second collar are each configured to connect respective opposite end portions of the first elongated member in such a way that the first elongated member is fixedly attached at the opposite end portions of a length of the first chair-connection member of the wheelchair assembly.

14. The apparatus of claim 1, wherein the adaptor assembly further includes:
a second elongated member; and
the second elongated member is configured to be fixedly attached along a length of the second chair-connection member of the wheelchair assembly; and
a third collar and a fourth collar are each configured to connect respective opposite end portions of the second elongated member in such a way that the second elongated member is fixedly attached at the opposite end portions of a length of the second chair-connection member of the wheelchair assembly.

15. The apparatus of claim 1, wherein:
the adaptor assembly is configured to be selectively attachable to, and selectively detachable from, the side-to-side spaced-apart side frame members of the wheelchair assembly; and
the adaptor assembly is also configured to be movable between the folded condition and the unfolded condition of the wheelchair assembly in such a way that the adaptor assembly remains attached to the side-to-side spaced-apart side frame members of the wheelchair assembly in the folded condition and in the unfolded condition of the wheelchair assembly.

16. A chair-drive interface assembly for connection to a wheelchair assembly and a drive assembly, the wheelchair assembly including a seating assembly, a back support assembly, a first chair-connection member that extends laterally beneath the seating assembly, and a second chair-connection member that extends laterally beneath the seating assembly and rearward of the first chair-connection member, wherein the first and second chair-connection members are connected together at a fixed spacing from one another by at least one frame member of the wheelchair assembly, the drive assembly including at least one drive wheel, a motor and a battery, the apparatus comprising:

at least one collar for the first chair-connection member, wherein each of the at least one collar for the first chair-connection member has an aperture that extends laterally and is sized to mount to the first chair-connection member;

at least one collar for the second chair-connection member, wherein each of the at least one collar for the second chair-connection member is positioned rearwardly of the at least one collar for the first chair-connection member, and has an aperture that extends laterally and is sized to mount to the second chair-connection member;

a first bracket that is connected to the at least one collar for the first chair-connection member;

a second bracket that is connected to the at least one collar for the second chair-connection member, wherein the first bracket and the second bracket are pivotally connected to each other at a non-zero angle by way of a pivot member that extends laterally, so as to form an angle joint that extends in a longitudinal-vertical plane of the wheelchair assembly; and a docking assembly that is connected to at least one of the first and second brackets and which extends forwardly from the first and second brackets, wherein the docking assembly includes at least one engagement feature that is shaped to receive at least one drive connector on the drive assembly, wherein the docking assembly includes:

a first latch assembly; and a second latch assembly, wherein the first latch assembly and the second latch assembly are spaced apart from each other; and the first latch assembly is configured to selectively attach to, and selectively detach from, the drive connector of the drive assembly; and the second latch assembly is configured to selectively attach to, and selectively detach from, an adaptor assembly that is configured to be selectively attachable to, and selectively detachable from elements of the wheelchair assembly, and wherein the docking assembly includes a first engagement feature and a second engagement feature, which are shaped to releasably engage corresponding adaptor assembly elements on the adaptor assembly, wherein the second latch assembly is positioned to engage one of the corresponding adaptor assembly elements to releasably lock the docking assembly to the adaptor assembly, and wherein the docking assembly includes a third engagement feature and a fourth engagement feature, which are shaped to releasably engage corresponding drive assembly elements on the drive connector of the drive assembly, wherein the first latch assembly is positioned to engage one of the corresponding drive assembly elements to releasably lock the docking assembly to the drive assembly.

17. The chair-drive interface assembly as claimed in claim 16, wherein the at least one collar for the first chair-connection member includes a first collar for the first chair-connection member and a second collar for the first chair-connection member that is spaced laterally from the first collar for the first chair-connection member, wherein a first elongate member connects the first collar for the first chair-connection member and the second collar for the first chair-connection member together, and wherein the first bracket is connected to the first elongate member, wherein the at least one collar for the second chair-connection member includes a first collar for the second chair-connection member and a second collar for the second chair-connection member that is spaced laterally from the first collar for the second chair-connection member, and wherein a second elongate member connects the first collar for the second chair-connection member and the second collar for the second chair-connection member together, and wherein the second bracket is connected to the second elongate member.

18. The chair-drive interface assembly as claimed in claim 16, wherein the adaptor assembly includes:

a third bracket assembly; and the third bracket assembly is configured to be fixedly connected to the second bracket assembly at a selected portion of the second bracket assembly in such a way that the third bracket assembly is adjustably mountable to the second bracket assembly at predetermined locations positioned along a length of the second bracket assembly.

19. A chair-drive interface assembly for connection to a wheelchair assembly and a drive assembly, the wheelchair assembly including a seating assembly, a back support assembly, a first chair-connection member that extends laterally beneath the seating assembly, and a second chair-connection member that extends laterally beneath the seating assembly and rearward of the first chair-connection member, wherein the first and second chair-connection members are connected together at a fixed spacing from one another by at least one frame member of the wheelchair assembly, the drive assembly including at least one drive wheel, a motor and a battery, the apparatus comprising:

at least one collar for the first chair-connection member, wherein each of the at least one collar for the first chair-connection member has an aperture that extends laterally and is sized to mount to the first chair-connection member;

at least one collar for the second chair-connection member, wherein each of the at least one collar for the second chair-connection member is positioned rearwardly of the at least one collar for the first chair-connection member, and has an aperture that extends laterally and is sized to mount to the second chair-connection member;

a first bracket that is connected to the at least one collar for the first chair-connection member;

a second bracket that is connected to the at least one collar for the second chair-connection member, wherein the first bracket and the second bracket are pivotally connected to each other at a non-zero angle by way of a pivot member that extends laterally, so as to form an angle joint that extends in a longitudinal-vertical plane of the wheelchair assembly; and a docking assembly that is connected to at least one of the first and second brackets and which extends forwardly from the first and second brackets, wherein the docking assembly includes at least one engagement feature that is shaped to receive at least one drive connector on the drive assembly, wherein the adaptor assembly includes:

a third bracket assembly; and the third bracket assembly is configured to be fixedly connected to the second bracket assembly at a selected portion of the second bracket assembly in such a way that the third bracket assembly is adjustably mountable to the second bracket assembly at predetermined locations positioned along a length of the second bracket assembly.

* * * * *